(12) United States Patent
Overhultz et al.

(10) Patent No.: US 8,531,273 B2
(45) Date of Patent: Sep. 10, 2013

(54) SYSTEMS AND METHODS FOR CONTROLLING SERIALLY CONNECTED RFID TRANSMITTERS AND RECEIVERS

(75) Inventors: Gary L. Overhultz, River Forest, IL (US); John W. Pyne, Erie, CO (US); Gordon E. Hardman, Boulder, CO (US)

(73) Assignee: OSA Acquisition, LLC, Chicago, IL (US)

( * ) Notice: Subject to any disclaimer, the term of this patent is extended or adjusted under 35 U.S.C. 154(b) by 409 days.

(21) Appl. No.: 12/901,936

(22) Filed: Oct. 11, 2010

(65) Prior Publication Data
US 2011/0090065 A1 Apr. 21, 2011

Related U.S. Application Data

(60) Provisional application No. 61/250,727, filed on Oct. 12, 2009.

(51) Int. Cl.
*G08B 21/00* (2006.01)
(52) U.S. Cl.
USPC ..... 340/10.42; 340/10.1; 340/10.3; 340/10.5; 340/572.1; 370/336; 370/337
(58) Field of Classification Search
USPC ................................. 370/336, 337
See application file for complete search history.

(56) References Cited

U.S. PATENT DOCUMENTS

| 5,751,220 | A | * | 5/1998 | Ghaffari | 340/12.31 |
| 7,586,416 | B2 | * | 9/2009 | Ariyoshi et al. | 340/572.7 |
| 7,791,453 | B2 | * | 9/2010 | Chen et al. | 340/10.2 |
| 2005/0073418 | A1 | * | 4/2005 | Kelliher et al. | 340/572.1 |
| 2007/0001813 | A1 | * | 1/2007 | Maguire et al. | 340/10.2 |
| 2007/0046467 | A1 | * | 3/2007 | Chakraborty et al. | 340/572.1 |
| 2007/0262849 | A1 | * | 11/2007 | Ismail | 340/10.1 |

* cited by examiner

*Primary Examiner* — Mohammad Ghayour
*Assistant Examiner* — Mark Rushing
(74) *Attorney, Agent, or Firm* — Medley, Behrens & Lewis, LLC; Nathan T. Lewis

(57) ABSTRACT

Systems and methods are provided for monitoring a plurality of RFID tags. A system includes a plurality of serially connected transmitters along a transmit path, where each of the serially connected transmitters are configured to relay a received transmitter selection signal when the transmitter selection signal identifies a selected transmitter as being further along the transmit path than the serially connected transmitter and transmit an identification impulse using a transmit antenna when the transmitter selection signal identifies the serially connected transmitter as being the selected transmitter. A system further includes a control unit responsive to a plurality of transmit paths, the control unit being configured to send the transmitter selection signal along a selected transmit path, where the transmitter selection signal identifies one of the plurality of serially connected transmitters along the selected transmit path as the selected transmitter for transmitting the identification impulse.

23 Claims, 17 Drawing Sheets

SYSTEMS AND METHODS FOR CONTROLLING SERIALLY CONNECTED RFID TRANSMITTERS AND RECEIVERS

CROSS-REFERENCE TO RELATED APPLICATIONS

This application claims priority to U.S. Provisional Application No. 61/250,727 filed Oct. 12, 2009, entitled "RFID Systems and Methods," the entirety of which is herein incorporated by reference.

This document is related to PCT Application No. PCT/US2005/037138, entitled "Distributed Antenna Array with Centralized Data Hub for Determining Presence and Location of RF Tags," filed Oct. 18, 2005, U.S. Pat. No. 6,951,305, entitled "Advertising Compliance Monitoring System," filed Mar. 20, 2003, U.S. Pat. No. 7,423,516, entitled "Systems and Methods for Approximating the Location of an RFID Tag," filed May 4, 2006, and U.S. patent application Ser. No. 12/732,797, entitled "Systems and Methods for Controlling Serially Connected Transmitters in RFID Tag Tracking," filed Mar. 26, 2010, the entirety of each of which is herein incorporated by reference.

TECHNICAL FIELD

This document relates generally to radio-frequency identification and more particularly to radio-frequency identification transmitter/receiver architectures.

BACKGROUND

The use of electronic product code (EPC) tags is expanding on a global basis. EPC tag cost is dropping, and EPC performance continues to periodically improve. Passive EPC tags acquire all required energy from an RF identification impulse signal sent by a reader module ("control unit"), while battery-assisted tags, such as battery-assisted tags from Goliath Solutions, LLC, utilize energy from an attached battery in generating a response to a received identification impulse signal. Identification impulse energy declines with the square of the distance from the reader module. Physics of tag sensitivity and strict regulations regarding maximum reader/antenna power output combine to produce limits as to the distance a passive EPC or battery-assisted tag can be located and read from a given antenna.

FIG. 1 depicts an example plot of the received power of an identification impulse signal at a passive EPC tag versus the distance of the tag from the reader module. A tag threshold is included at −18 dBm as a dashed line. The tag threshold sensitivity is a key determinant of the maximum distance from the reader that a passive EPC tag may be read. Under current FCC regulations and technology, the maximum distance from a reader that a passive EPC may be read is about 12.5 meters under very good conditions. Battery-assisted tags may be effective at further distances because the transmitted identification impulse signal need only reach the tag with enough power to be read by the tag, as the response may be assisted by the attached battery. Despite the added coverage distance, which may be several times the effective passive EPC distance, many choose to utilize the passive EPC tags due to their reduced cost and size, as well as their potential for use with other applications that rely on standard reader protocols.

EPC RF interference with and from other RF systems has also been a substantial difficulty in EPC system design. Lighting, cell phones, inventory scanner guns, and even nearby EPC readers and tags have been found to diminish EPC system performance. This is in addition to environmental challenges, such as the presence of metal or liquid. Because of variances in the size and layout of different locations where RFID systems are to be implemented, which may result in very different or continually changing RF environments in which to operate, expensive RF experts and RF monitoring equipment has often been required in implementing a cost-effective EPC tracking system that is able to support a high enough accuracy rate to be worth the costs of implementing and maintaining.

To combat the high costs of EPC tracking system implementation, the scope and goals of tracking systems are often simplified to mitigate the above-described RF environment difficulties. For example, most EPC applications to date have been limited to a relatively small number of readers, such as at distribution "pinch-points" (e.g., loading docks), where EPC tags in cases and pallets passing through the pinch-point may be monitored. This type of system design limits the space between reader antennas and tags through deliberate placement of readers and antennas along a small number of predetermined paths of tag travel.

FIG. 2 depicts a prior art EPC RFID reader unit. The reader unit 202 includes several RF ports 204 that are dedicated transmit or receive ports. The ports 204 may also be full duplex RF ports, where the reader unit 202 may transmit and receive simultaneously on the same port. While such a system may be effective in monitoring EPC tags in a limited scope, such as the pinch-point monitoring described above, such a system may not be cost effective in broader area RFID monitoring, where a large number of expensive reader units 202 would be required to cover the desired area (e.g., a 10,000-square-foot drug store may require 40 or more reader units 202 to implement full passive EPC tag monitoring coverage). Classically-developed EPC reader and antenna technology is constrained by the distance a given antenna can be from the reader before cable loss attenuates the signal below useable levels. This adds to the cost of the initial system, as well as to the cost of installation due to the number of independent systems that must be deployed to cover a sizable space.

SUMMARY

In accordance with the teachings herein, systems and methods are provided for monitoring a plurality of RFID tags. The systems and methods may include a plurality of serially connected transmitters along a transmit path, where each of the serially connected transmitters are configured to: relay a received transmitter selection signal when the transmitter selection signal identifies a selected transmitter as being further along the transmit path than the serially connected transmitter and transmit an identification impulse using a transmit antenna when the transmitter selection signal identifies the serially connected transmitter as being the selected transmitter. The systems and methods may further include a control unit responsive to a plurality of transmit paths, the control unit being configured to send the transmitter selection signal along a selected transmit path, where the transmitter selection signal identifies one of the plurality of serially connected transmitters along the selected transmit path as the selected transmitter for transmitting the identification impulse. The systems and methods may further include a receiver configured to receive an RFID response signal generated in response to the transmitted identification impulse using a receive antenna.

BRIEF DESCRIPTION OF THE DRAWINGS

FIGS. 14A and 14B depict example contents of a transmit order data structure.

FIGS. 16A and 16B depict example contents of a transmitter-receiver order data structure.

FIGS. 18A and 18B depict example contents of a transmitter-receiver order data structure.

DETAILED DESCRIPTION

To date, loss of RF energy to power passive EPC tags over distance has been a major impediment to monitoring EPC tags in retail environments. Further, signal loss through extended cable length has been a major determinant of the distance an antenna can reside from an EPC reader and, hence, has limited the number of antennas associated with a given reader. These factors, combined with the expense of procuring and installing EPC readers, have prevented open monitoring of voluminous retail selling areas. While pinch-point and other close proximity techniques (e.g., handheld reader scanning) are useful in their narrow realms, it may be desirable to monitor RFID tags over a much larger area such as the inside of a drug store or other retail environment where the close proximity techniques are ineffective.

For example, it may be desirable to implement an in-store display tracking system, where product displays are placed at the end of aisles and at other locations throughout the retail environment. Product displays may include integrated RFID tags that permit tracking of the presence and location of the displays within the retail environment. When merged with point-of-sale scanner data, the location of these product displays may be correlated with the sale data to assess the value of the merchandising materials. Store data (e.g., point-of-sale data, product display presence data, product display location data, etc.) may be used to generate alerts for managers or other personnel that identify programs and displays that are not being executed optimally. Data across stores may be aggregated to assess overall program effectiveness, which may be fed back to purchasing and production organizations to eliminate ineffective programs or serve as the basis for future enhancements. Product display data may also be beneficial for advertisers to monitor whether their in-store promotions, for which they are paying, are being properly implemented within the stores. Advertising compliance monitoring system details are included in U.S. Pat. No. 6,951,305, incorporated by reference herein.

As another example, RFID inventory tracking within the store may be beneficial in tracking product-on-hand for use in determination of optimum product reorder times to reduce inventory-on-hand and improve inventory turnover metrics. In-store EPC reads may be integrated with reads from other EPC readers located throughout the production and distribution channel to improve efficiency or respond quickly to reorder opportunities. Improved data gathering about disposition of products in "the last 100 feet" of their distribution cycle may enable significant logistic gains.

Figure 1:
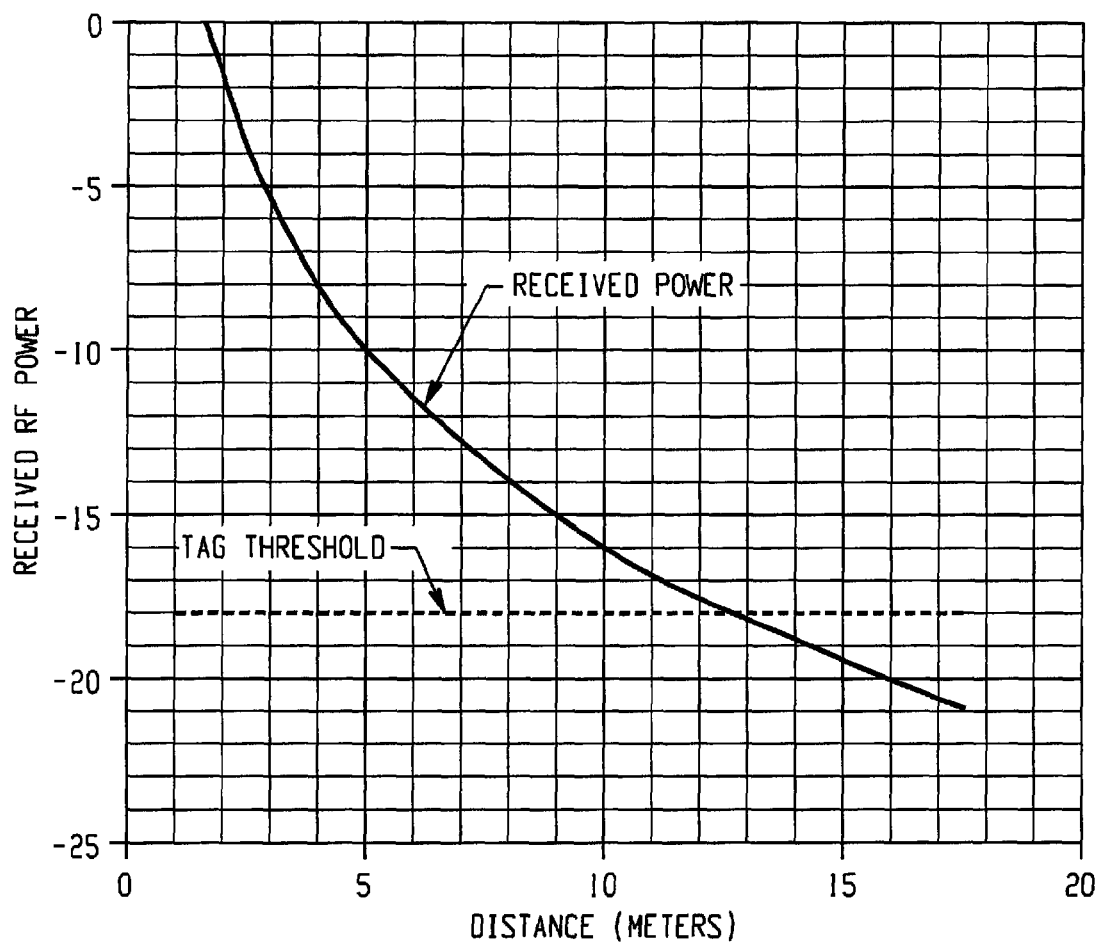
FIG. 1 depicts an example plot of the received power of an identification impulse signal at a passive EPC tag versus the distance of the tag from the reader module.
Figure 2:
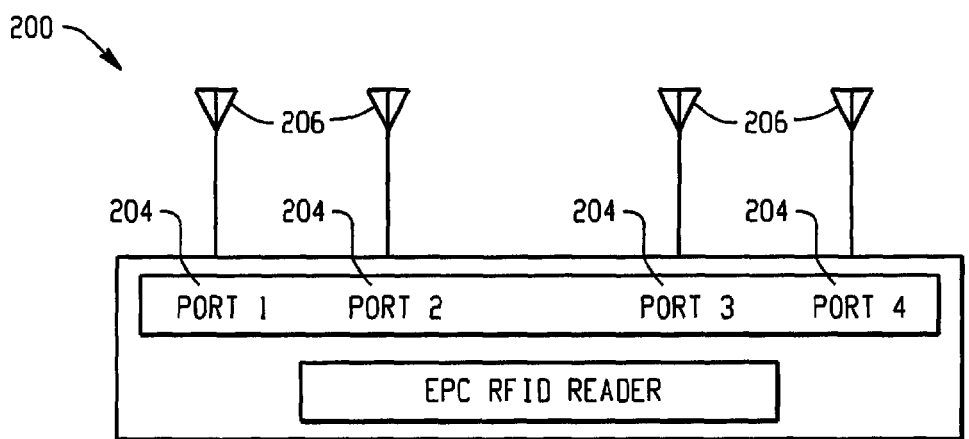
FIG. 2 depicts a prior art EPC RFID reader unit.
Figure 3:
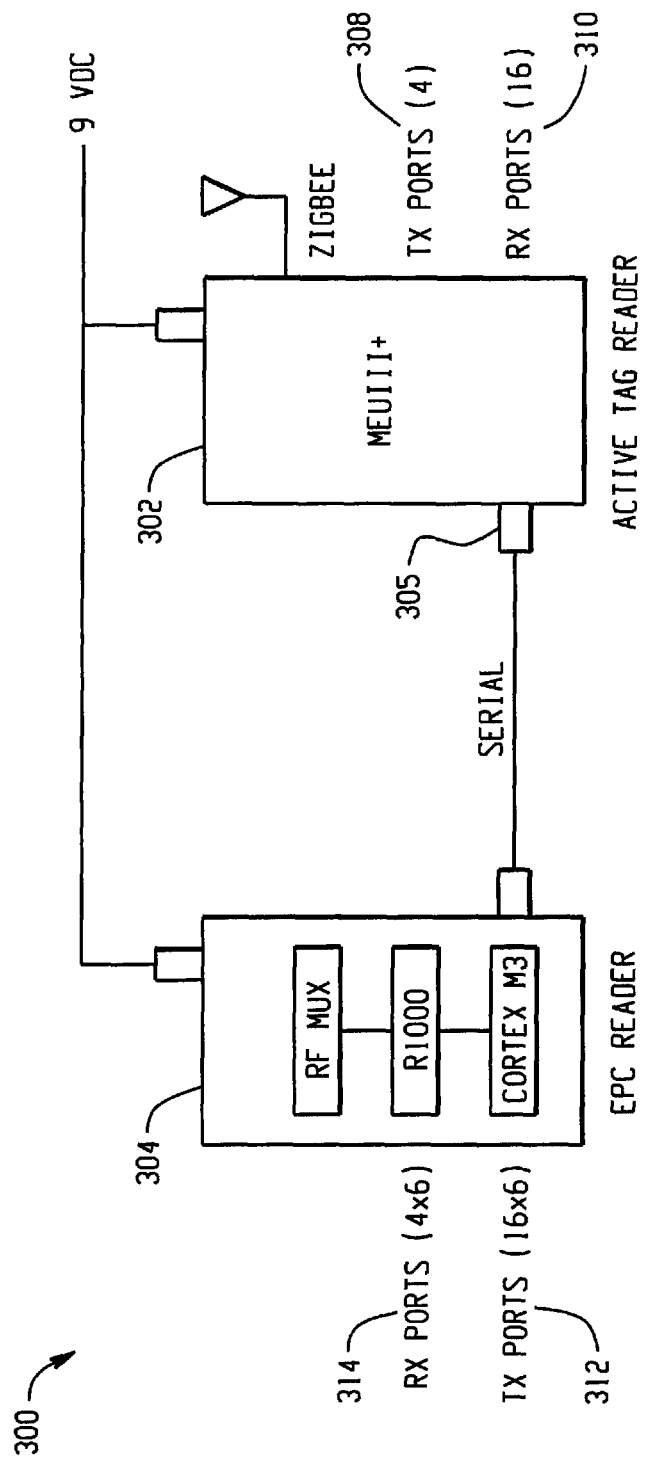
FIG. 3 depicts an RFID monitoring reader configuration that includes an active tag reader module responsive to an EPC reader module via a serial data connection.

A flexible RFID monitoring reader unit that can accommodate both passive tags, such as EPC tags, as well as active tags can be implemented in a variety of ways. For example, FIG. 3 depicts an RFID monitoring reader configuration that includes an active tag reader module 302 responsive to an EPC reader module 304 via a serial data connection 305. The active tag reader module 302 includes a zigbee antenna 306 for communication with a control unit or other modules in an implemented system as well as transmitter ports 308 and receiver ports 310 for communicating with transmitter and receiver units. The EPC reader module 304 can receive control data from the control unit via the serial data connection 305. The EPC reader module 304 contains submodules for handling the EPC protocol as well as transmitter ports 312 and receiver ports 314 for communicating with transmitter and receiver units.

Figure 4:
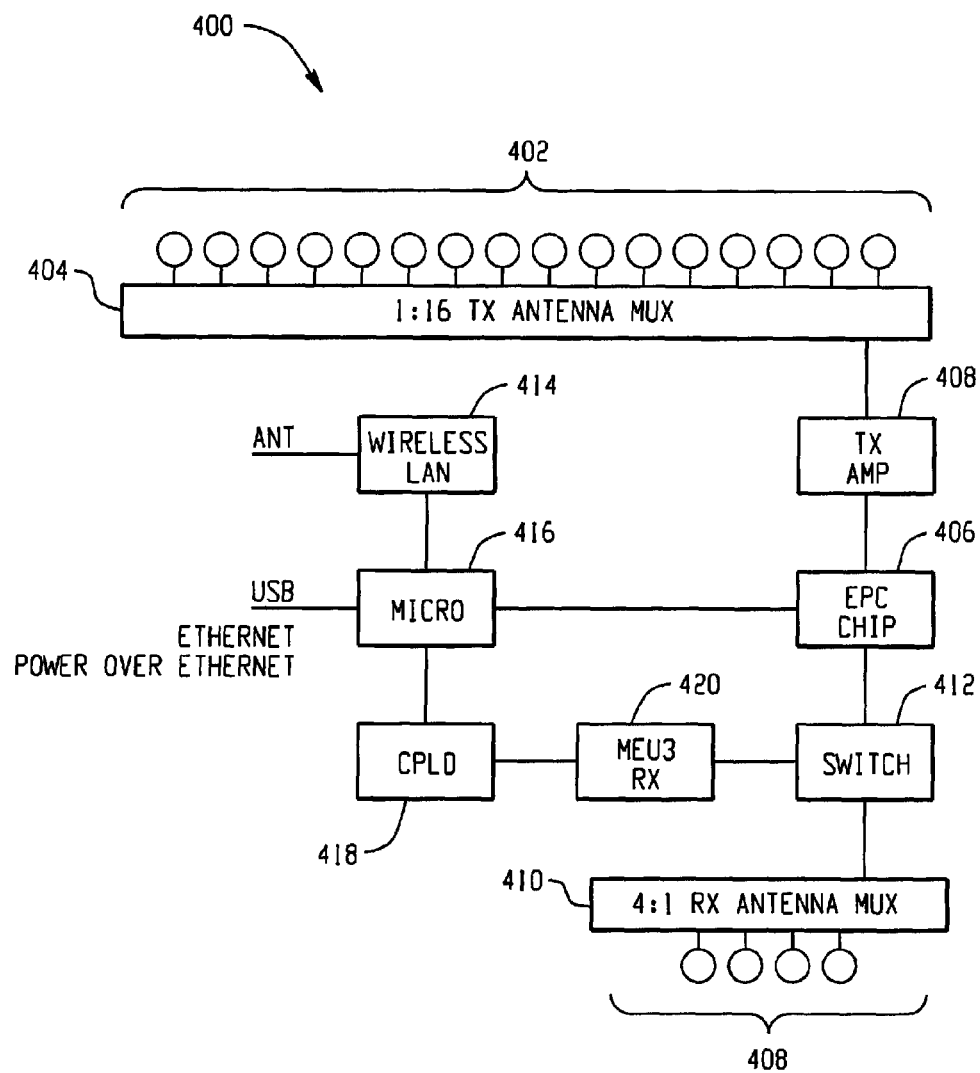
FIG. 4 is a block diagram depicting internal components of an integrated RFID monitoring reader unit.

FIG. 4 is a block diagram depicting internal components of an integrated RFID monitoring reader unit 400. The reader unit 400 includes 16 transmitter connection ports 402 responsive to a 1:16 transmitter antenna multiplexer 404. The transmitter multiplexer 404 propagates signals from an EPC chip 406 that are amplified at a transmitter amplifier 408. The EPC chip 406 may contain logic for selection of which of the transmitter connection ports 402 is to be activated. The EPC chip 406 may also provide commands on which of a series of serially connected transmitter units along a transmit path connected to a transmitter connection port 402 is to be the selected transmitter. The EPC chip 406 may further provide command data as to which of a plurality of RFID protocols is to be used in transmission of an identification impulse signal. The EPC chip 406 may further be responsive to a plurality of receiver connection ports 408 through a 4:1 receiver antenna multiplexer 410 and a switch 412. The EPC chip 406 may provide command data identifying which one or more or all of the receiver connection ports 408 are active for receiving RFID response data. The EPC chip 406 may also provide command data as to which of a series of serially connected receiver units along a receive path connected to a receiver connection port 408 is to be a selected receiver.

A MEU3 receiver chip 420 may be included for providing command data to and receiving RFID response data from the transmitter connection ports 402 and the receiver connection ports 408. The MEU3 may contain instructions for managing communications according to a non-EPC protocol, such as communications with Goliath LLC battery-assisted beacon backscatter tags. A Goliath battery-assisted tag is described in PCT Application No. PCT/US2005/037138, incorporated by reference herein. A switch 412 may regulate communications between the transmitter connection ports 402 and the receiver connection ports 408 with one of the EPC chip 406 and MEU3 receiver chip 420 depending on the current protocol mode. The RFID monitoring reader 400 may further include external connections elements such as an antenna module 414 and a USB or other protocol (e.g., micro module 416) that enable connections between the RFID monitoring reader 400 and external hardware.

Figure 5:
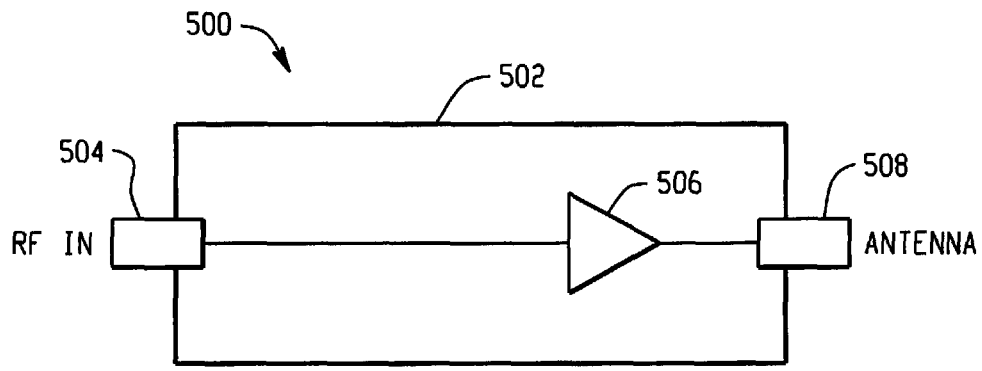
FIG. 5 is a block diagram of a stand-alone transmitter unit.

FIG. 5 is a block diagram of a stand-alone transmitter unit. Transmit commands may be received by the transmitter unit 502 at an RF input port 504 from an RFID monitoring reader via coaxial cable or other cabling means. The received command data may be amplified by an amplifier 506 before being output as an RFID identification impulse through an antenna 508. The stand-alone transmitter unit 502 may be connected to one of a plurality of transmitter connection ports on an RFID monitoring reader or may be connected at the end of a transmit path containing multiple transmitter units.

The command data received at the RF input 504 may include protocol identification data. The protocol identification data may identify a protocol by which the identification impulse is to be transmitted. For example, in a passive EPC mode, the identification impulse may be amplified by the high-power amplifier 506 to the maximum allowable FCC power to reach the non-battery-assisted EPC tags as far away from the transmitter unit 502 as possible. In contrast, in a battery-assisted EPC mode, the amplifier 506 may amplify the identification impulse at a lower level, allowing the transmitter unit 502 to activate tags within the same radius as the passive EPC mode while offering a power usage savings. As noted above, battery-assisted EPC tags may be activated at a much further distance from the transmitter unit 504 because the identification impulse is not relied upon for providing power for the RFID response signal. The battery-assisted EPC mode identification impulse may also be amplified at the same level as the passive EPC mode by the amplifier 506 to potentially avoid activating RFID tags at a greater radius than is possible for non-battery-assisted tags.

A number of other transmitter configurations may also be implemented. For example, a transmitter may be configured to generate identification impulses by switching between two orthogonal linear-polarized transmitter radiating elements. Such a configuration can overcome a 3 dB signal loss commonly associated with circular-polarity transmitter or tag antennas. This configuration can enable identification of an orientation of a linear polarity RFID tag by comparing signal strengths of the responses provided by an RFID tag after being activated by the orthogonally transmitted identification impulses. Knowing the orientation of an RFID tag can be valuable for a number of reasons. For example, the orientation of a tag can identify whether an advertising display is facing parallel to a path of walking traffic or perpendicular to the path of walking traffic in a store. The orientation of a tag can also be used to identify whether a display or product is located at the end of an aisle in a store visible to all consumer traffic or in the length of the aisle, making it visible only to a subset of traffic.

Figure 6:
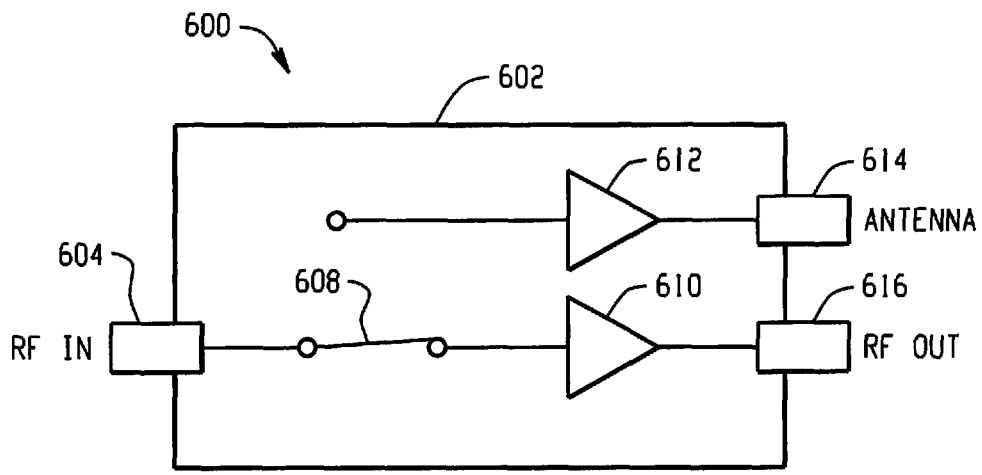
FIG. 6 is a block diagram depicting a transmitter unit for use in series of transmitter units along a transmit path.

FIG. 6 is a block diagram depicting a transmitter unit for use in a series of transmitter units along a transmit path. A transmit path may include a plurality of transmitter units similar to the unit depicted in FIG. 6 and may also include a stand-alone transmitter unit similar to the unit depicted in FIG. 5 at the end of the transmit path. Transmit command data is received at the transmitter unit 602 from an RFID monitoring reader at an RF input 604. The transmit command data includes data identifying which transmitter of a series of serially connected transmitters along a transmit path is the selected transmitter for transmitting the identification impulse. The transmitter unit 602 is aware of its position on the transmit path through a position switch, another position identification means, or via a position self-detection algorithm. Upon receiving transmit command data via the RF input 604, a comparison is made between the transmitter selection data in the received transmit command data and the transmitter unit position. If the selected transmitter, identified by the transmitter selection data, is further down the transmit path, then the transmitter unit functions in a command repeater mode, as shown in FIG. 6.

In a repeater mode, an RF switch is toggled to enable the transmit command data to be passed to the next transmitter unit along the transmit path, as shown at 608. An amplifier 610, may amplify the transmit command data to compensate for losses and distortions along inter-transmitter unit linkages and within transmitter units themselves. The amplifier 610 may also provide other conditioning to the received transmit command data signal. The amplified transmit command data signal is then forwarded to the next serially connected transmitter unit along the transmit path via an RF output 616. The amplifier 610 may amplify the transmit command data at a higher or lower power level than the amplifier 612 used in a transmit mode in conjunction with an antenna 614. In an alternate configuration, a same amplifier may be used for amplification in all transmitter modes. The amplifiers 610, 612 may include a control loop for restoring the received signal to a defined level via an adjustable gain. Such an adjustable gain may be utilized to ensure that all propagated and transmitted signals remain within FCC regulations.

Figure 7:
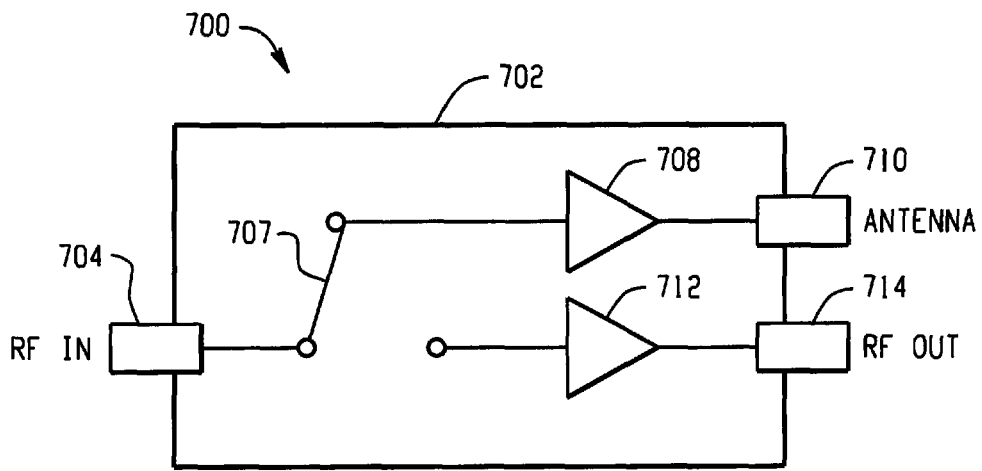
FIG. 7 is a block diagram depicting a transmitter unit in a series of transmitter units along a transmit path in transmit mode.

FIG. 7 is a block diagram depicting a transmitter unit in a series of transmitter units along a transmit path in transmit mode. The transmitter unit 702 receives transmit command data via an RF input 704. The transmitter unit 702 has been identified as the third transmitter unit along the transmit path via a switch setting 706. In the example of FIG. 7, command data has been received via the RF input 704 from an RFID monitoring reader identifying the depicted transmitter as being the selected transmitter. This command data may be sent via a variety of methods including a time-sensitive pulse, a voltage level, or other methods such as the inclusion of one or more modulated tones identifying the selected transmitter. Upon recognition that the transmitter unit 702 is the selected transmitter, an RF switch 707 is toggled, activating an amplifier 708. The amplifier 708 may amplify the identification impulse up to a maximum allowed by FCC regulations or to another level above or below the regulations level. The identification impulse may then be broadcast via the antenna 710. In an alternative configuration, the transmit command data may be transmitted to later transmitter units beyond the selected transmitter via the amplifier 712 and the RF output 714. Transmit command data to transmitter units beyond the selected transmitter may be amplified at a nominal amplifier 712 level or at a lower standby level or not at all. Later transmitter units along the transmit path may similarly pass the transmit command data or not pass the transmit command data at all in a standby mode.

In addition to a switch or other mechanical position indicator, a transmitter unit 702 may detect its position in the transmit path by measuring the strength of a calibration signal that the transmitter unit 702 receives and propagates via the RF output 704. For example, the RF output amplifier 702 may have an operational gain, used when the transmit path is being used to send an identification impulse or a transmitter selection signal, and a configuration gain, used when the transmit path is in an enumerate mode for transmitter units to identify their position in the transmit path. In the enumerate mode, a carrier signal is transmitted along the transmit path, and each transmitter unit applies the configuration gain to the carrier signal and propagates the carrier signal to a next transmitter unit in the transmit path. The transmitter units may then measure the level of the carrier signal at the unit to determine the transmitter unit's position. For example, the transmitter unit may compare a measured carrier signal level with a table to determine the transmitter unit's position.

Figure 8:
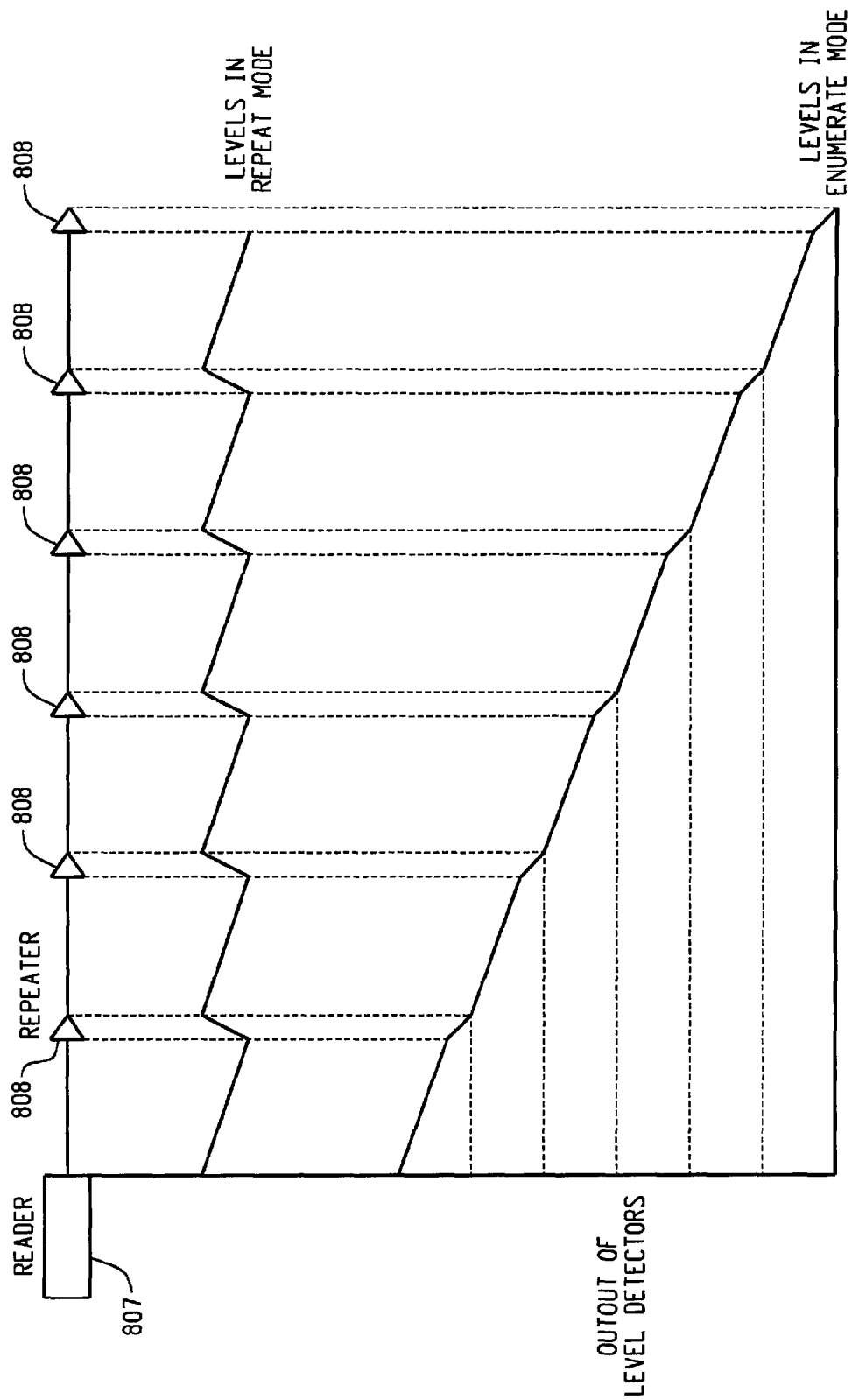
FIG. 8 is a graph depicting the strength of a signal sent from a reader unit and relayed by a plurality of transmitter units that include repeaters.

FIG. 8 is a graph depicting the strength of a signal sent from a reader unit 807 and relayed by a plurality of transmitter units 808 that include repeaters. As shown in the top plot, when the repeaters in the serially connected transmitter units 808 relay a signal using an operational gain, the signal levels in that repeat mode remain relatively constant. In contrast, when a calibration signal is transmitted using a lesser configuration gain in an enumerate mode, the configuration signal level degrades at each transmitter unit 808 as shown in the bottom plot. By measuring the strength of the configuration signal level at a transmitter unit 808 in an enumerate mode, the transmitter unit 808 can determine its position in the set of serially connected transmitter units 808.

As an example, a fabrication factory may perform test and calibration measurements on each transmitter unit. During this process, two values may be stored in a memory at the transmitter unit: one representing a value needed to produce a +8 dBm output (DAC1) and one value needed to produce a +1 dBm output (DAC2). The DAC1 value is used during normal operation in repeater mode and DAC2 is used in the enumeration mode. The following table displays typical values of RF level outputs and DAC2 values with six antennas operating.

TABLE 1

Typical RF Level Outputs and DAC Values

| Station | RF output level (dBm) | DAC2 values |
|---|---|---|
| 1 | +1 | 124 |
| 2 | −6 | 169 |
| 3 | −13 | 214 |
| 4 | −20 | 260 |
| 5 | −27 | 305 |
| 6 | −34 | 351 |

If an antenna connected to an RF port is commanded to perform enumeration and its DAC value measures 173 counts, then the antenna determines its position to be 2, based on the closeness of 173 to the DAC2 value of 169 for station 2 in the table. If another antenna has a DAC value that measures 301 counts, then that antenna determines its position to be 5.

In another configuration, a similar effect can be created using a DC signal value via a parallel path between the RF input and RF output ports of a transmitter controlled by a switch. In an operational mode, the switch disconnects the parallel path, and signals are passed along a transmit path as shown above in FIG. 6. In the operational mode, the input and output voltages are substantially similar, as shown by the top graph in FIG. 8. In an enumerate mode, the switch disconnects the operational mode path and connects the parallel path having a Zener diode thereon. The Zener diode creates a predictable drop in the voltage between the RF input and RF output ports, creating the staircase effect shown at the bottom of FIG. 8. The reader 807 transmits a signal at a predetermined voltage in enumerate mode, and each transmitter, knowing the predictable voltage drop caused by the Zener diode at each transmitter, calculates its position along the path based on the voltage level at that transmitter.

Figure 9:
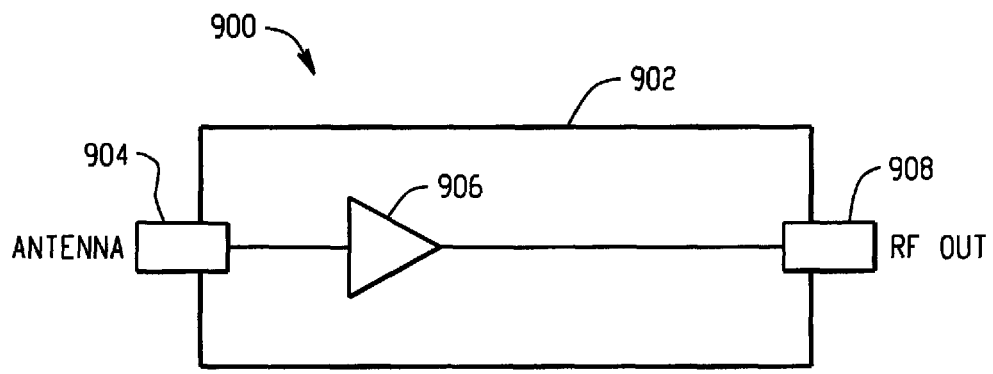
FIG. 9 is a block diagram depicting a stand-alone receiver unit.

FIG. 9 is a block diagram depicting a stand-alone receiver unit. The stand-alone receiver unit 902 listens for RFID responses via an antenna 904. Signals detected by the antenna 904 may be amplified by an amplifier 906 before being propagated from the stand-alone receiver unit 902 via an RF output port 138. The stand-alone receiver unit 902 may be connected to a receiver connection port on an RFID monitoring reader or may be included at the end of a receive path including multiple receive units.

Figure 10:
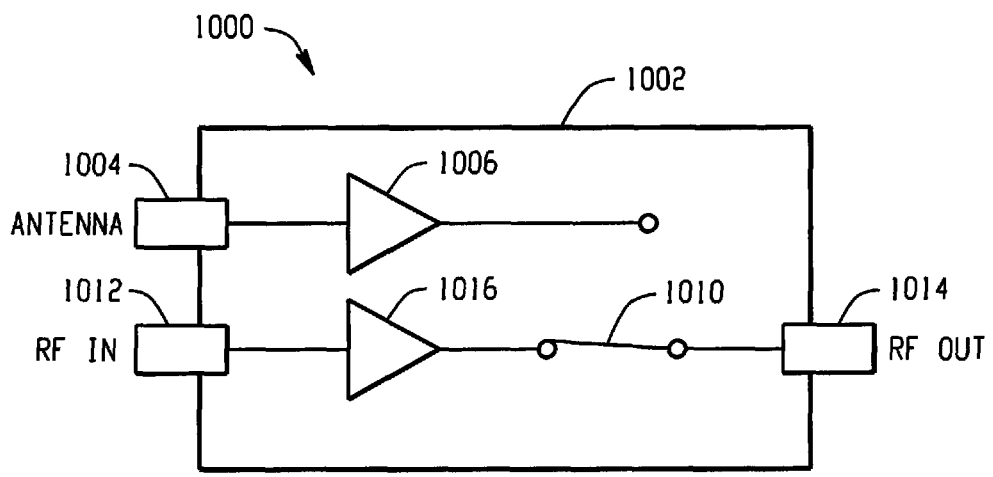
FIG. 10 is a block diagram depicting a receiver unit for use in a receive path with a plurality of serially connected receiver units.

FIG. 10 is a block diagram depicting a receiver unit for use in a receive path with a plurality of serially connected receiver units. The receiver unit includes an antenna 1004 connected to an amplifier 1006 for amplifying signals detected by the antenna 1004. Identification of the position of a receiver unit may be implemented in a variety of ways including manually, such as via a switch, as well as self-position-identification procedures that may not require a manual identification. In the example of FIG. 10, receive command data has identified a selected receiver unit as being further along the receive path than the receiver unit 1002. Upon receiving such receive command data, the receiver unit is configured to a repeater mode via toggling of an RF switch 1010. Toggling the RF switch 1010 in a repeater mode enables propagation of response data from receiver units later in the receive path received at the RF input port 1012 and output via the RF output port 1014 as well as the propagation of receive command data from the RFID monitoring reader to later receiver units. An amplifier 1016 may be included along the repeater path to amplify and/or condition data signals received from the RF input port 1012. The low-power amplifier may include a control loop for restoring the received signal to a defined level via an adjustable gain.

Figure 11:
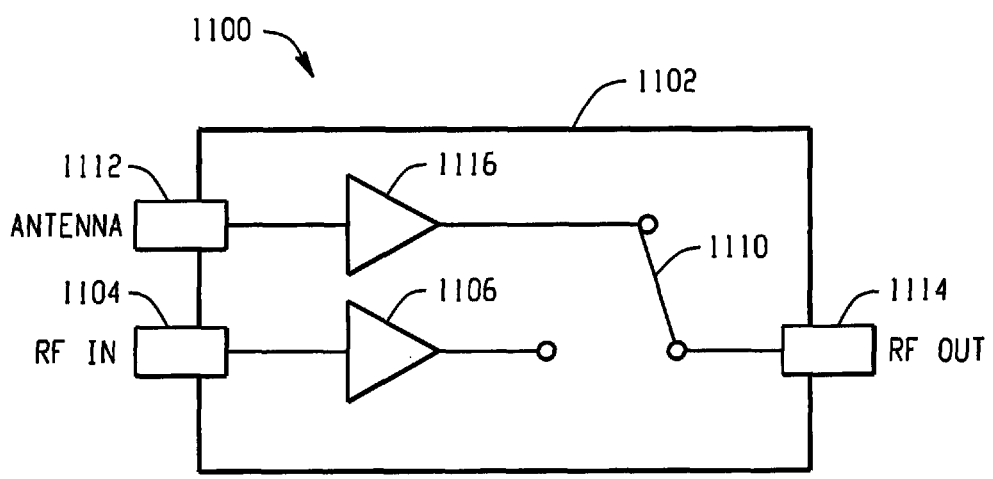
FIG. 11 is a block diagram depicting a receiver unit in a receive mode for use in a receive path with a plurality of receiver units.

FIG. 11 is a block diagram depicting a receiver unit in a receive mode for use in a receive path with a plurality of receiver units. The receiver unit 1102 includes an RF input port 1104 and an amplifier 1106 for propagating signals from other receiver units further along a receive path when the receiver unit 1102 is in a repeater mode. Upon receiving receive command data identifying the second receiver unit 1102 as the selected receiver, the RF switch 1110 is toggled to place the receiver unit 1102 in a receive mode. This enables RFID response data corresponding to RFID response signals received at the antenna 1112 to be propagated to an RFID monitoring reader via the RF output port 1114. The received RFID response signals may be amplified and conditioned by an amplifier 1116 before transmission along the receiver path.

As an alternative to a switch or another mechanical position indicator, a receiver unit 172 may detect its position in the receive path via an enumeration mode similar to the enumeration mode described above with respect to the transmit unit and depicted in FIG. 8. In an enumeration mode, a carrier signal is propagated along the receive path. A receive unit 1102 measures a level of the carrier signal at that receive unit 1102. Based on the range in which that measured level falls, the receive unit 1102 identifies its position in the receive path.

Figure 12:
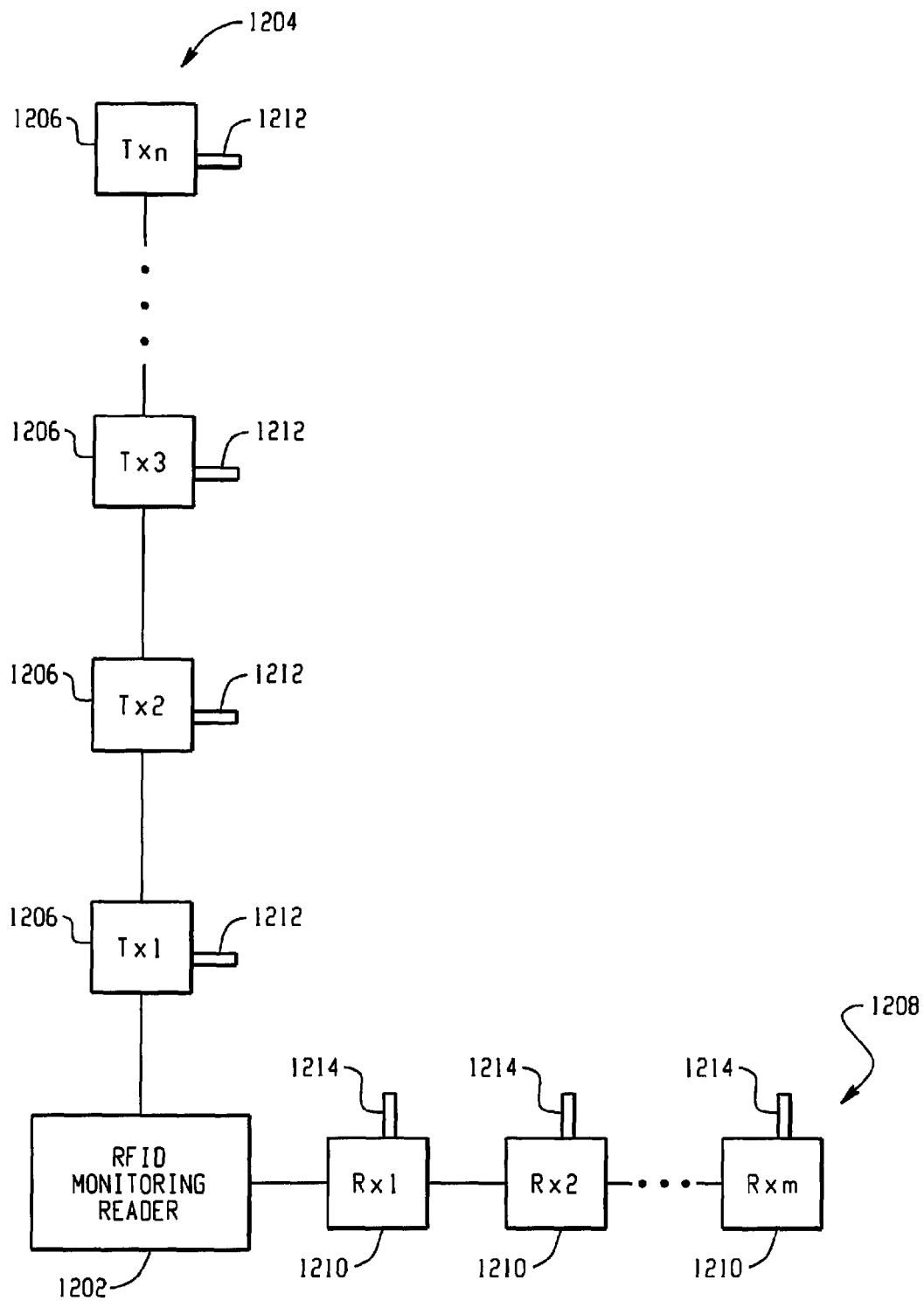
FIG. 12 is a block diagram depicting an RFID monitoring reader responsive to a transmit path having a plurality of serially connected transmitter units and a receive path having a plurality of serially connected receiver units.

FIG. 12 is a block diagram depicting an RFID monitoring reader 1202 responsive to a transmit path 1204 having a plurality of serially connected transmitter units 1206 and a receive path 1208 having a plurality of serially connected receiver units 1210. Each of the transmitter units 1206 includes an antenna 1212. For example, a transmitter unit 1206 may utilize a crossed dipole with a reflector, where each dipole is connected to a quadrature hybrid to provide circular polarization. As another example, a transmitter unit 1206 may utilize two dipole antennas radiating sequentially enabling a determination of the axial orientation of the linear-polarity passive EPC tags by comparing received signal strength indications and read counts from each dipole. As a further example, an antenna can have one, two, or more components associated with its station (e.g., two orthogonal linear-polarity elements may be utilized in each station to identify the orientation of a tag in an X-Y plane, where the resulting RSSI's and read counts are reported with each element along with a station number).

Each of the receiver units 1210 also includes an antenna 1214. For example, a receiver unit 1210 may utilize a quadrifilar helix, having a range compensating pattern that allows higher gains at offset angles to bore sight with a circular polarization and good axial ratio on and off bore sight. As depicted in FIG. 12, up to n transmitter units and m receiver units may be included on a transmit path and receive path, respectively, as hardware capabilities may allow. For example, the number of transmitter units 1206 and receiver units 1210 may be limited by the amount of DC current that can be provided by the RFID monitoring reader 1202, the maximum amount of DC current that the connecting cables 1216 are able to carry, or limitations on signal quality and conditioning throughout the transmit and receive paths.

Figure 13:
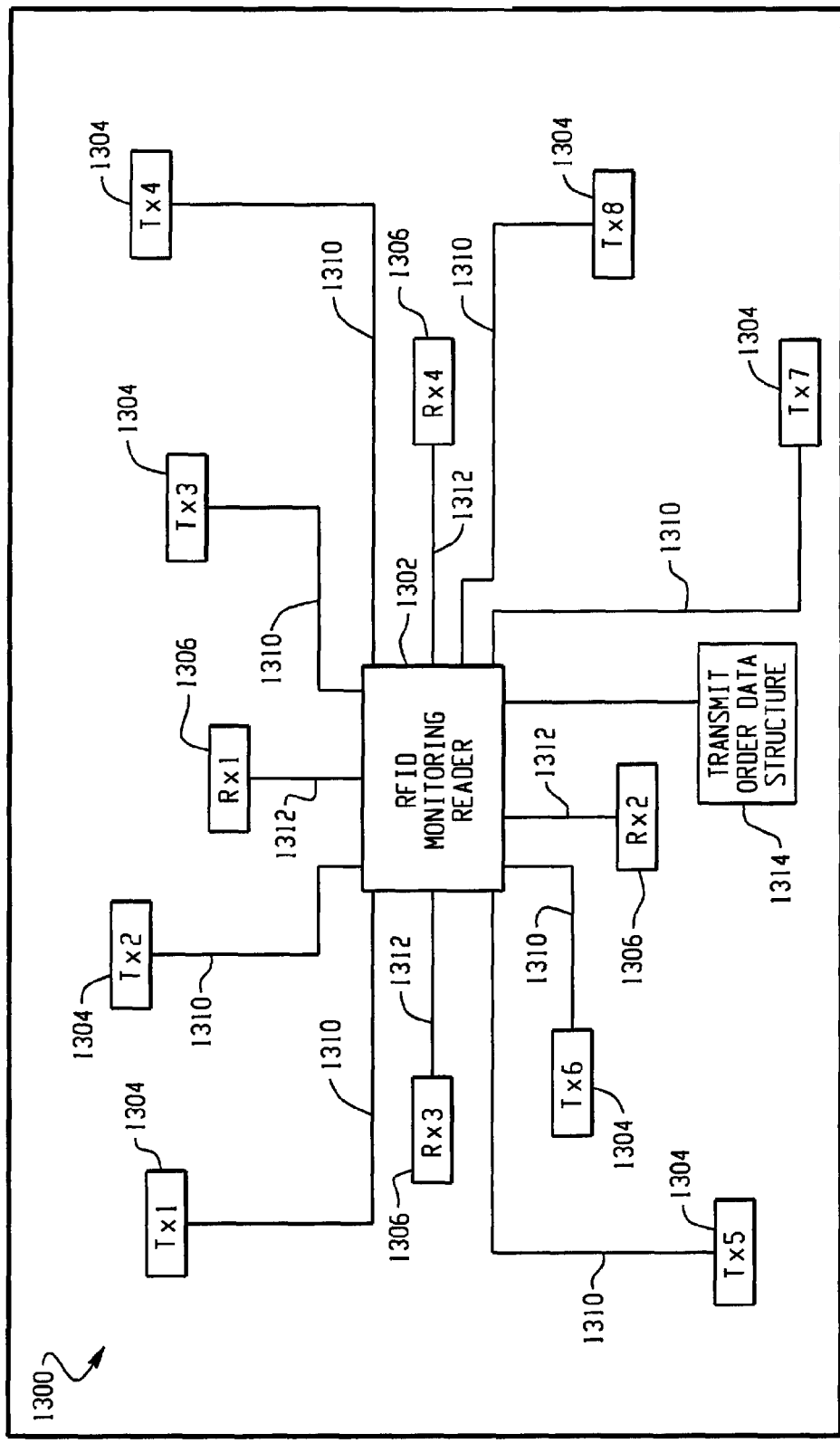
FIG. 13 is a block diagram depicting an RFID monitoring reader responsive to a number of transmitter units and a number of receiver units in a monitoring environment.

FIG. 13 is a block diagram depicting an RFID monitoring reader 1302 responsive to a number of transmitter units 1304 and a number of receiver units 1306 in a monitoring environment 1308. In tracking one or more RFID tags, the RFID monitoring unit 1302 may direct a transmitter unit 1304 to broadcast an identification impulse by sending transmit command data along one of the plurality of transmit paths 1310. The transmit command data may include a protocol according to which the identification impulse is to be transmitted. The RFID monitoring reader 1302 also selects one or more of the receiver units 1306 to listen for RFID response signals in response to the transmitted identification impulse by sending receive command data on one of the receive paths 1312. Receiver units 1306 designated as selected by the receive command data listen for RFID response signals and propagate RFID response data to the RFID monitoring reader 1302 detailing the detected RFID response signals.

The RFID monitoring reader 242 may also be responsive to a transmit order data structure 1314. For example, the RFID monitoring reader 1302 may include a computer-readable memory that contains the transmit order data structure 1314. The transmit order data structure 1314 identifies an order in which the RFID monitoring reader 1302 selects the transmitters 244 to transmit identification impulses.

Rather than proceeding ordinary through antennas, it may be desirable to give priorities to certain "hot spots" within the monitoring environment 1308, where RFID tags are probed more often than other areas of the monitoring environment 1308. For example, a particular area of a store that contains high-value merchandise or an area near a store exit may be deemed hot spots. As another example, a key promotional zone may be deemed a hot spot to facilitate close monitoring of the presence or absence of tags on advertising displays. As the number of antennas within a monitoring environment 1308 grows, the option to get a quick read on selected sub-areas can become more valuable.

A transmit order data structure 1314 may facilitate dictating a non-sequential transmitter selection order to the RFID monitoring reader 1302, enabling closer monitoring of desired hot spots. FIGS. 14A and 14B depict example contents of a transmit order data structure. FIG. 14A depicts selection of eight transmitters in order. The RFID monitoring reader could repeat this ordered sequence to achieve continued even coverage of a monitoring environment. FIG. 14B depicts a selection order that dictates selection of transmitter Tx1 more often than the other transmitters. Such a selection order could be desirable where the sub-area of the monitoring environment near Tx1 is deemed a hot spot. Transmitter Tx1 is selected at alternating transmitter selection opportunities, while the remaining transmitters are selected in order in interleaved selection slots.

Many variations of such interleaving can be implemented using a transmit order data structure. For example, a system could begin by selecting all transmitters at an equal rate. Such an order may then be automatically updated to select transmitters in areas with significant detected RFID tag movement more frequently. For example, an area of the store with a popular good would have RFID tags leaving the area at a high rate. The system notes the recognition of fewer RFID tags in succeeding scans and identifies that area of the store as a hot spot. A transmitter associated with that area may then be selected more often to provide better coverage of that area having more frequent RFID tag movement.

Figure 15:
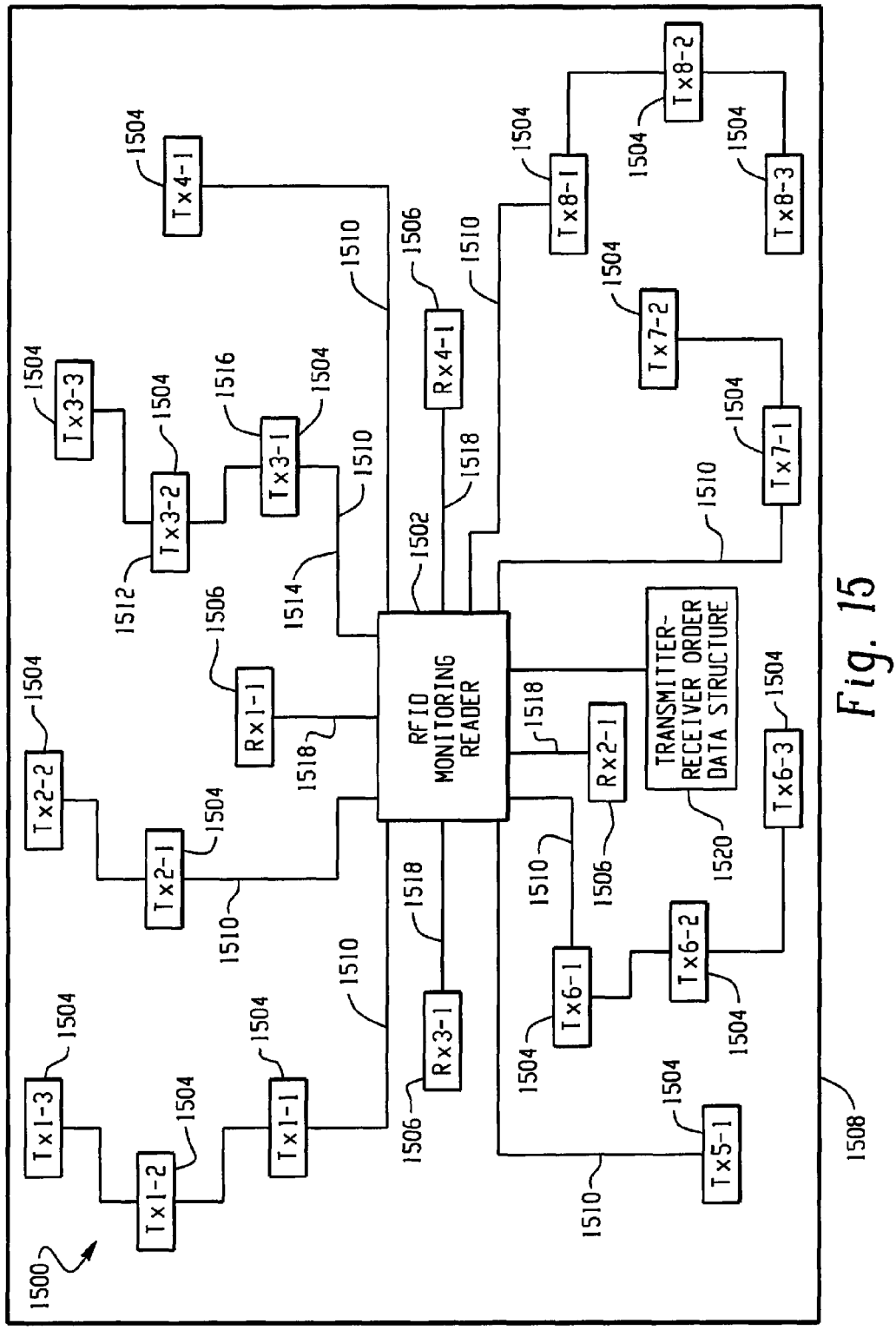
FIG. 15 is a block diagram depicting an RFID monitoring reader responsive to a number of serially connected transmitter units and a number of receiver units in a monitoring environment.

FIG. 15 is a block diagram depicting an RFID monitoring reader 1502 responsive to a number of serially connected transmitter units 1504 and a number of receiver units 1506 in a monitoring environment 1508. In tracking one or more RFID tags, the RFID monitoring unit 1502 may direct a transmitter unit 1504 to broadcast an identification impulse by sending transmit command data along one of the plurality of transmit paths 1510. The transmit command data may include a protocol according to which an identification impulse is to be sent. The transmit command data may also include data identifying which transmitter unit 1504 along the selected transmit path is the selected transmitter unit for transmitting the identification impulse. For example, to select transmitter Tx3-2 1512, the RFID monitoring unit 1502 sends transmit command data along transmit path 1514. The transmit command data identifies the second transmitter in the transmit path as the selected transmitter 1512. Upon receipt of the transmit command data at transmitter Tx3-1 1516, transmitter Tx3-1 1516 enters a repeater mode, as described above with respect to FIG. 6, for example, and forwards the transmit command data to transmitter Tx3-2 1512. Upon receipt of the transmit command data at transmitter Tx3-2 1512, transmitter Tx3-2 1512 enters a transmit mode, as described above with respect to FIG. 7, for example, and transmits the directed identification impulse. Transmitter Tx3-2 1512 may or may not propagate the transmit command data to later transmitter units along the selected transmit path 1514. The RFID monitoring reader 1502 may also select one or more receiver units 1506 for listening for RFID response signals in response to the transmitted identification impulse via receiver command data transmitted on one or more of the receiver paths 1518. The receiver command data may identify a protocol according to which the selected receiver units should expect RFID response signals.

The RFID monitoring reader 1502 may be responsive to a transmitter-receiver order data structure 1520. The transmitter-receiver order data structure 1520 identifies an order in which transmitters and receivers are selected to transmit an identification impulse and listen for a response. The transmitter-receiver order data structure 1520 may be used by the RFID monitoring reader 1502 in a similar manner as the transmit order data structure described with respect to FIG. 13. For example, certain areas of a monitoring environment 1508 may be probed more often to satisfy reduced latency between scan requirements for those areas.

FIGS. 16A and 16B depict example contents of a transmitter-receiver order data structure. FIG. 16A depicts an ordered traversal of transmitters and receivers that can generate an even coverage of a monitoring environment. In contrast, FIG. 16B dictates a more random selection of transmitters and receivers that may correspond to increased scanning of areas deemed hot spots or to accomplish another business objective.

Figure 17:
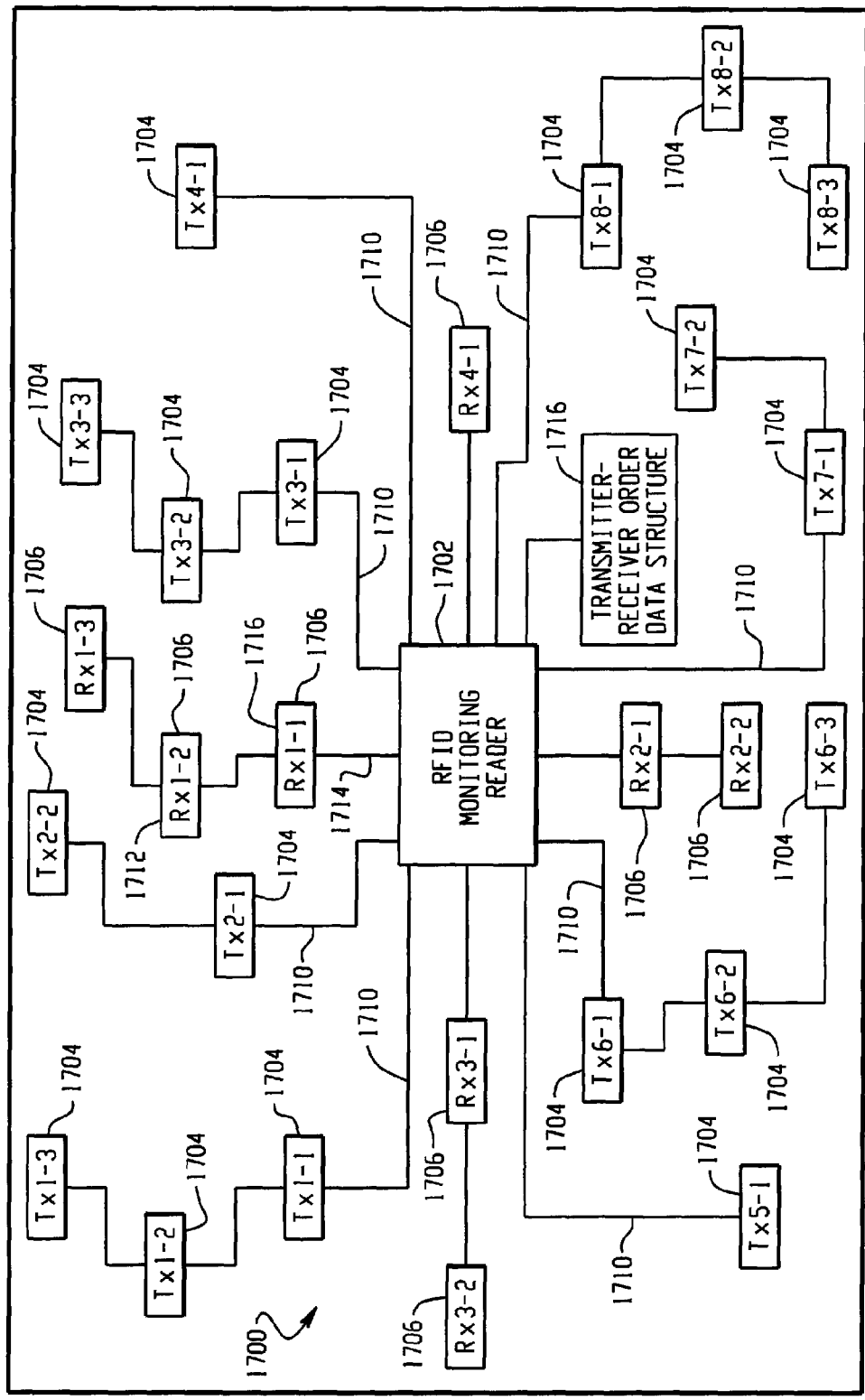
FIG. 17 is a block diagram depicting an RFID monitoring reader responsive to a number of serially connected transmitter units and a number of serially connected receiver units in a monitoring environment.

FIG. 17 is a block diagram depicting an RFID monitoring reader 1702 responsive to a number of serially connected transmitter units 1704 and a number of serially connected receiver units 1706 in a monitoring environment 1708. The RFID monitoring reader 1702 selects a transmitter unit 1704 along one of the transmit paths 1710 to transmit an identification impulse signal. This may be accomplished, for example, as described with respect to FIG. 15. The RFID monitoring reader 1702 also selects one or more receiver units 1706 for listening for RFID response signals in response to the transmitted identification impulse. The receiver command data may identify a protocol according to which the selected receiver units should expect RFID response signals. The receive command data will identify which receiver units along a selected receive path 1714 are selected receiver units to listen for RFID response signals. For example, to select transmitter Rx1-2 1712, the RFID monitoring unit 1702 sends receive command data along receive path 1714. The receive command data identifies the second transmitter in the receive path as the selected receiver 1712. Upon receipt of the receive command data at receiver Rx1-1 1716, receiver Rx1-1 1716 enters a repeater mode, as described above with respect to FIG. 10, for example, and forwards the receive command data to receiver Rx1-2 1712. Upon receipt of the receive command data at receiver Rx1-2 1712, receiver Rx1-2 1712 enters a receive mode, as described above with respect to FIG. 11, for example, and listens for RFID response signals to propagate as RFID response data to the RFID monitoring reader. Receiver Rx1-2 1712 may or may not propagate the receive command data to later transmitter units along the selected receive path 1714.

The RFID monitoring reader 1702 may be responsive to a transmitter-receiver order data structure 1716. The transmitter-receiver order data structure 1716 identifies an order in which transmitters and receivers are selected to transmit an identification impulse and listen for a response. The transmitter-receiver order data structure 1716 may be used by the RFID monitoring reader 1702 in a similar manner as the transmitter-receiver order data structure described with respect to FIG. 15. For example, certain areas of a monitoring environment 1708 may be probed more often to satisfy reduced latency between scan requirements for those areas.

FIGS. 18A and 18B depict example contents of a transmitter-receiver order data structure. FIG. 18A depicts an ordered traversal of transmitters and antennas that can generate an even coverage of a monitoring environment. In contrast, FIG. 18B dictates a more random selection of transmitters and receivers that may correspond to increased scanning of areas deemed hot spots or to accomplish another business objective.

Figure 19:
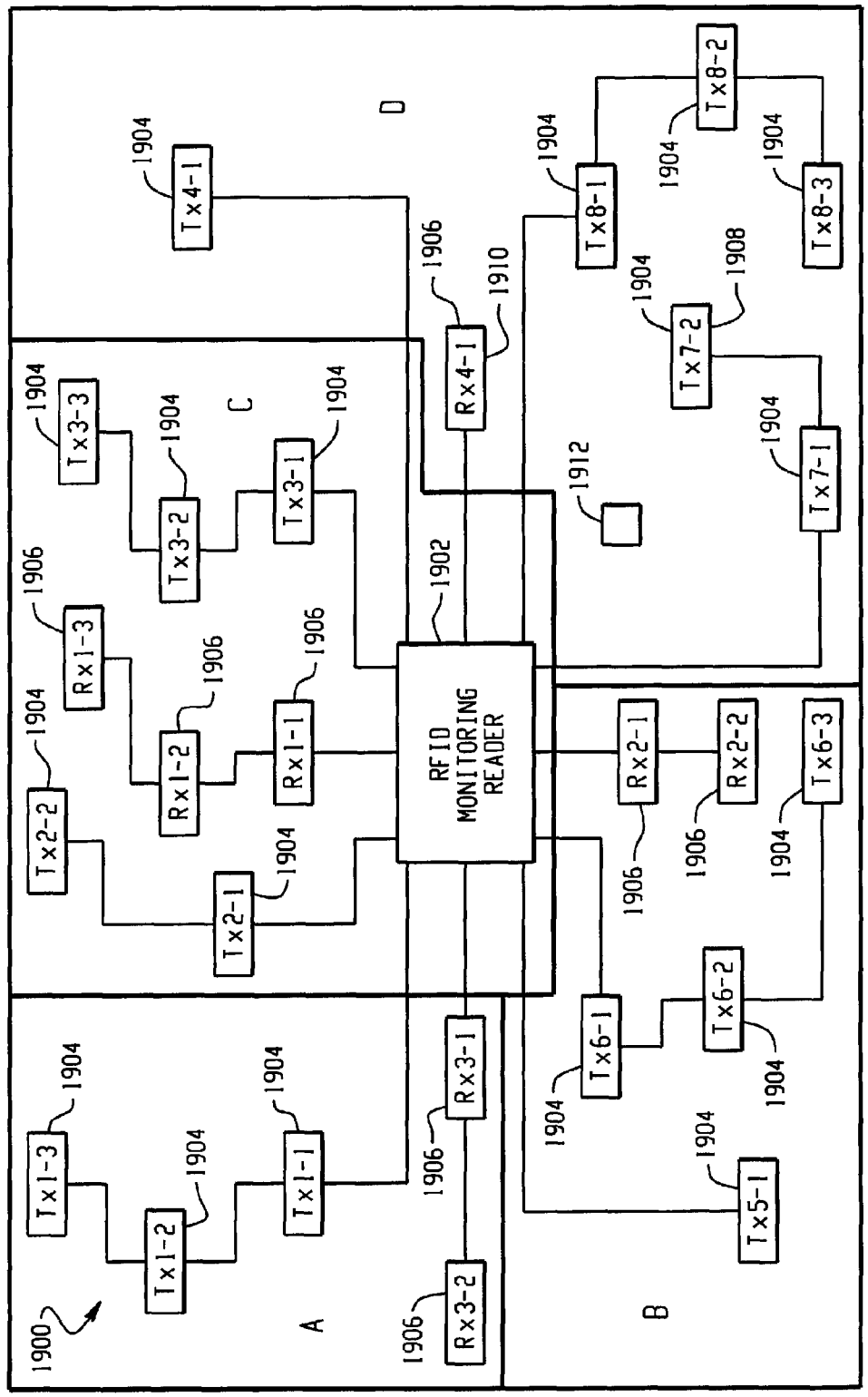
FIG. 19 is a block diagram depicting an RFID monitoring system that tracks locations of located RFID tags through the use of zones.

FIG. 19 is a block diagram depicting an RFID monitoring system that tracks locations of located RFID tags through the use of zones. The monitoring system includes an RFID monitoring reader that controls a plurality of transmitter units 1904 and receiver units 1906 over four zones labeled A, B, C, and D. By selecting a transmitter unit 1904 and one or more receiver units 1906 within a zone A, B, C, or D, a determination may be made as to whether an RFID tag is within or near the zone based on whether an RFID response is received at a selected receiver. This determination may be made based on the known maximum response distance characteristics of an RFID tag protocol. For example, if transmitter Tx7-2 1908 and receiver Rx4-1 1910 are selected and a response is received from an RFID tag 1912 at receiver RX4-1 1910, then a determination is made that RFID tag 1912 is in or near zone D. The use of zones and specifically paired transmitter and receiver units allows determinations of not only whether a tag is present within an entire monitoring area, but also where in the monitoring area that tag resides. Location data may also be determined according to techniques described in U.S. Pat. No. 7,423,516, entitled "Systems and Methods for Approximating the Location of an RFID Tag," incorporated by reference herein. The zones depicted in FIG. 19 can be used in conjunction with hot spot identifications to identify transmitter-receiver pairs that should be selected more often than transmitter-receiver pairs in non-hot spot zones to ensure better tracking of RFID tags in the hot spot areas.

Matching transmitters and receivers within different areas, such as those shown in FIG. 19, can also be used in determining more optimal transmitter-receiver pairings for locating RFID tags. For example, due to their distance apart, it may be the case that identification impulses transmitted by transmitter TX8-3 never result in any RFID tag readings at Rx3-2. Because this transmitter-receiver combination always results in zero RFID tag reads, any selection of this combination by the RFID monitoring reader 1902 is wasted time that could be better spent probing a transmitter-receiver combination that is more likely to garner results.

Figures 20, 21:
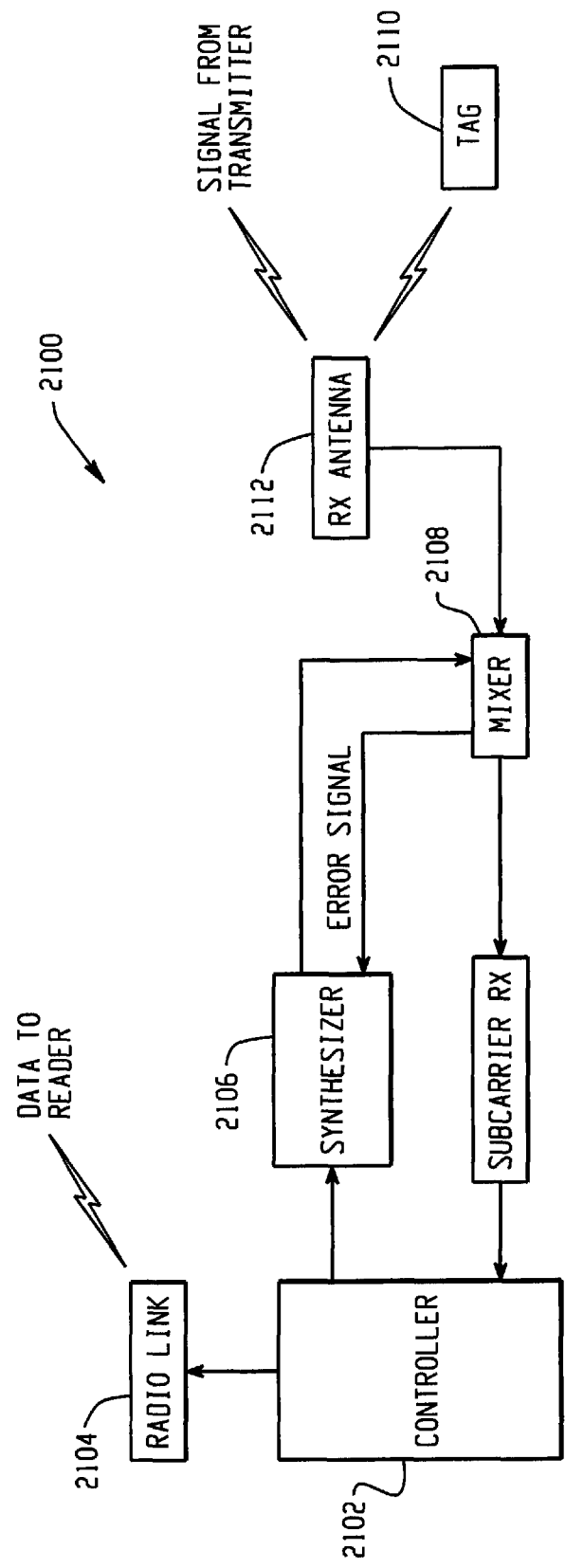
FIG. 20 is a block diagram depicting multiple RFID monitoring readers tracking a monitoring environment.
FIG. 21 depicts a carrier-locked remote antenna.

FIG. 20 depicts contents of an example allowed combination data structure. An RFID monitoring reader may be responsive to such a data structure, such as via a computer-readable memory of the RFID monitoring reader. The allowed combination data structure lists combinations of transmitters and receivers that can be selected for RFID tag identification. Cells having a '1' indicate an allowable combination of a transmitter and a receiver. For example, the allowed combination data structure identifies the combination of Rx1-1 and Tx2-3 as an allowable combination while the combination of Rx1-2 and Tx2-3 is not an allowable combination. The allowed combination data structure may be used in a variety of contexts. For example, if the RFID monitoring reader is configured to perform and ordered traversing of transmitter-receiver combinations, the RFID monitoring reader may check the allowed combination data structure prior to selecting a transmitter-receiver combination to see whether a next combination is allowed or should be skipped.

This written description uses examples to disclose the invention, including the best mode, and also to enable a person skilled in the art to make and use the invention. It should be noted that the systems and methods described herein may be equally applicable to other implementations. The patentable scope of the invention may include other examples that occur to those skilled in the art.

For example, the systems and methods may be implemented using one or more wireless receivers. Traditionally, receive antennas are connected to the reader via a cable. This is true whether the antenna is simple or if it does some signal processing, such as down-converting the received signal. A backscatter RFID reader transmits a constant carrier while receiving from a tag. The tag communicates by changing the signal reflected from its antenna. This modulates the backscattered signal from the antenna. With appropriate signal processing, the modulation produced by the tag can be recovered by the reader and the RFID tag information can be read.

Current RFID readers use direct conversion receivers. For long range systems (e.g., greater than 2 feet between reader and RFID tags), the receiver is often located a considerable distance from the transmitter. This results in increased overall system capital cost due to the cost of high-quality cable and labor cost of installation.

These costs can be eliminated by implementing a system where the backscatter signal can be completely demodulated at the receive antenna and the information read at the receiver can be transmitted to the RFID monitoring reader via a wireless link. To accomplish this, the receiver requires a copy of the carrier signal transmitted from the transmitter.

FIG. 21 depicts a carrier-locked remote antenna. A controller 2102 communicates with an RFID monitoring reader (not shown) via a wireless radio link 2104. A synthesizer 2106 functions in concert with a mixer 2108 to reconstruct a carrier frequency used in an identification impulse emitted by a transmitter. The identification impulse is received by the receiver and used for reconstruction and reading of the RFID tag data. The received identification impulse signal is mixed with the synthesizer signal at the mixer 2108 and a beat generated can be used by a phase-locked-loop to lock the synthesizer frequency to the remote transmitter frequency. The identification impulse also excites a tag 2110, generating a response signal that is received by the receiver antenna 2112. The received response is used in conjunction with the locked synthesizer frequency to read the response.

Figure 22:
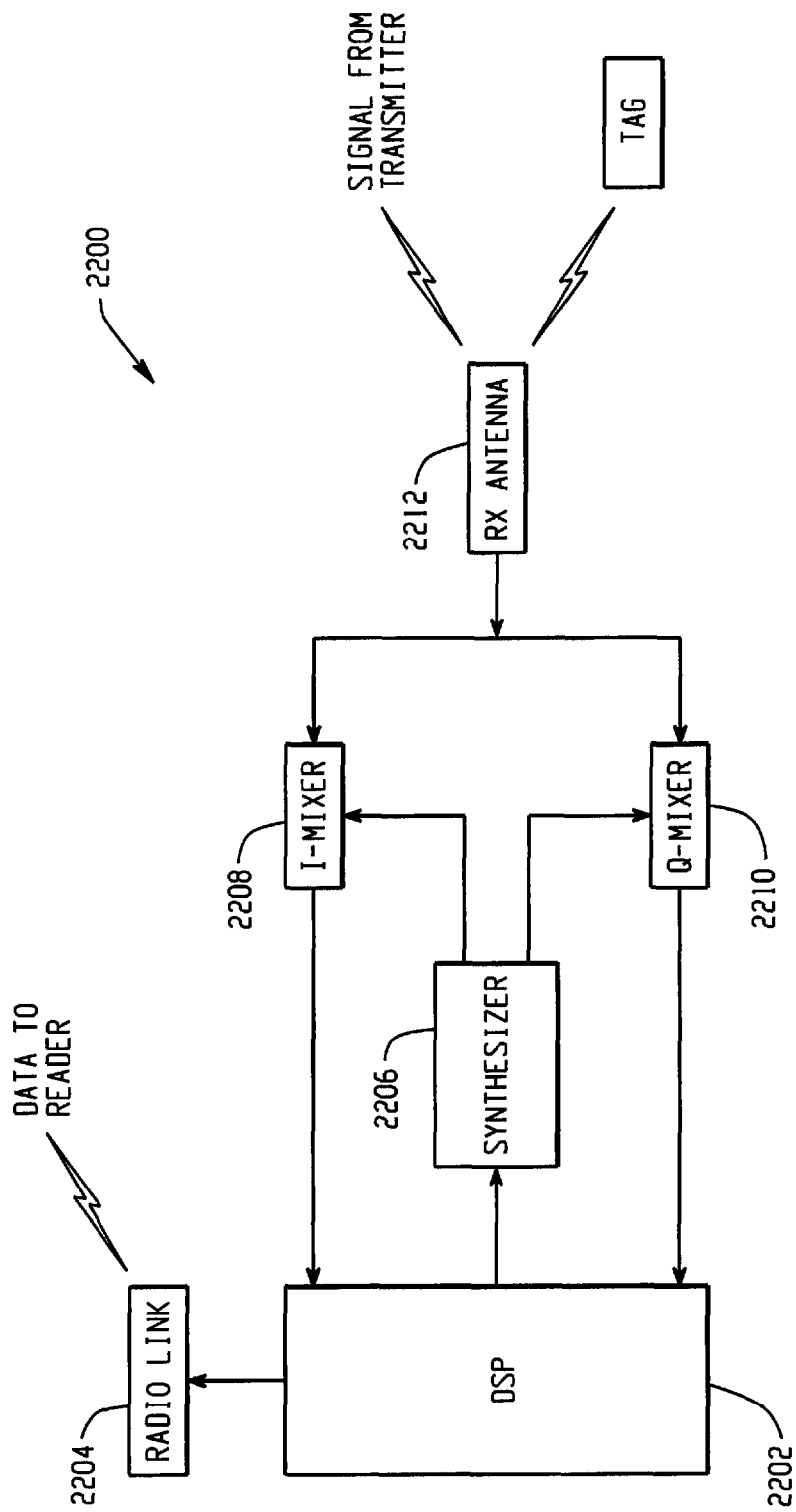
FIG. 22 depicts computed carrier remote antenna.

FIG. 22 depicts a computed carrier remote antenna. A controller ("digital signal processor") 2202 communicates with an RFID monitoring reader (not shown) via a wireless radio link 2204. The controller commands the synthesizer 2206 to be close to the expected frequency from the remote transmitter. I and Q mixers 2208, 2210 mix the tag and remote transmitter signals received at the receiver antenna 2212 to baseband. The difference between the remote and local synthesizers gives rise to a beat note. Because the I and Q mixers sample both phase and amplitude, a complete representation of the beat note as well as the subcarrier is represented by the digitized signals in the digital signal processor 2202. The beat note can be removed digitally by a numerical approach, and the subcarrier can be processed to recover the tag data. The radio link 2204 can be used to relay tag data to the main part of the receiver and can also be used in the opposite direction to provide the remote receivers with information on what frequency the synthesizer should be preset.

As a further example, receiver units may be implemented in a variety of configurations. For example, a receiver unit may be configured to rotate the phase of the demodulating carrier used to heterodyne the received signal down to baseband. In one example, the receiver rotates the demodulator phase to achieve the highest signal strength from the tag.

As another example, a receiver can be configured to rotate the phase of the demodulator each time the pool of tags is interrogated. Tag reading may be improved by rotating the phase 30 degrees each time the tags are interrogated. The phase is left constant during an interrogation and then rotated 30 degrees before attempting to read the tags again. This phase rotation can be done by actually rotating the phase of an RF signal, or in the case of a digital signal processor receiver, the phase rotation can be done mathematically by manipulation of the digitized received data.

In most software-defined receivers, the receiver demodulates an In Phase (I) and a Quadrature (Q) channel using two arbitrary local oscillator signals derived from the master oscillator. In and RFID reader, this oscillator is the same oscillator that feeds the transmit channel. After digitization, the I and Q signals can be mathematically rotated to give the equivalent of a single channel receiver with the local oscillator phase set wherever is desired. Conventional practice in RFID is to rotate the phase to give the maximum signal in the subcarrier frequency band. While this approach works well under some circumstances, it may perform more poorly as the range to the tags increases. This negative effect can be exacerbated if one or more of the following conditions is present: 1) the pool of tags is large; 2) the range difference between tags is small; and 3) if the tags are all polarized substantially the same. Under such conditions, an alternative approach is to not search for maximum signal strength, but to perform a series of reads in which the local oscillator phase is rotated by a fixed amount between successive reads. If this amount is chosen so that it does not repeat when the same hopping frequency appears on the same antenna phase, then, in time, all possible phase/frequency combinations will be presented to all antenna pairs. This configuration avoids a "standout" tag, which has good signal strength for a given antenna polarization, from "hiding" a weaker tag. Rotating the phase will eventually minimize the signal from the standout tag, while retaining a useable signal from a weaker tag, allowing it to be read.

As a further example, receivers may be implemented including adjustable low noise amplifiers. The receiver amplifier gains can be adjusted to increase performance of an RFID reader system. Too much gain can cause saturation and deteriorate performance. Too little gain may not enable the receiver to detect far away tags with weaker signals. RFID systems are often tasked with reading tags in close proximity as well as tags at the distance limits. A system that has programmable gains in the receiver low noise amplifier has the flexibility to work under many dynamic environments. Low noise amplifier gains may be programmed prior to and during scans for tags. For instance if a reader system was reading tags all with high values of RSSI then it could be presumed that the tags were in close proximity. Accordingly, the low noise amplifier gain could be programmed to a lower setting to prevent saturation and allow more tags to be read. In an alternate scenario, if the reader only detects a few tags with lower RSSI values, then the programmable gain of the LNA could be increased to increase the sensitivity and allow more tags to be read.

As an additional example, a system can be configured to use a transmitter that includes two orthogonally positioned antennas to improve signal strength received by a tag. As noted above, the distance at which an EPC tag can be read is typically limited by the strength of a forward link signal. This is due to the fact that the required power for the tag to wake up, listen, and respond is derived from the RFID reader transmitted power, which is limited by FCC rules. One way to maximize the read distance is to maximize the RF power coupled to the tag. Maximum power is coupled when the tag and transmitter antenna have similar polarizations. For instance a tag that has a linear antenna and is positioned vertically will be maximally coupled when the transmitter antenna is also a vertical linear antenna. Retail environments are commonly laid out on an X-Y grid. This means marketing displays or products are also located on the X-Y grid. Tag read performance may be maximized if the transmitter antennas are radiating linearly on the same X-Y grid. To take advantage of this phenomenon, antenna modules may be utilized which are made of two separate antennas. The antennas may be printed dipoles over a reflective ground plane and provide 6 dBil of gain. Both antennas may be positioned on the same plane but rotated 90 degrees from each other to provide linear transmissions which in line with the stores X-Y grid. This design may provide maximum performance while remaining compliant with FCC RF transmitter power limits.

Figure 23:
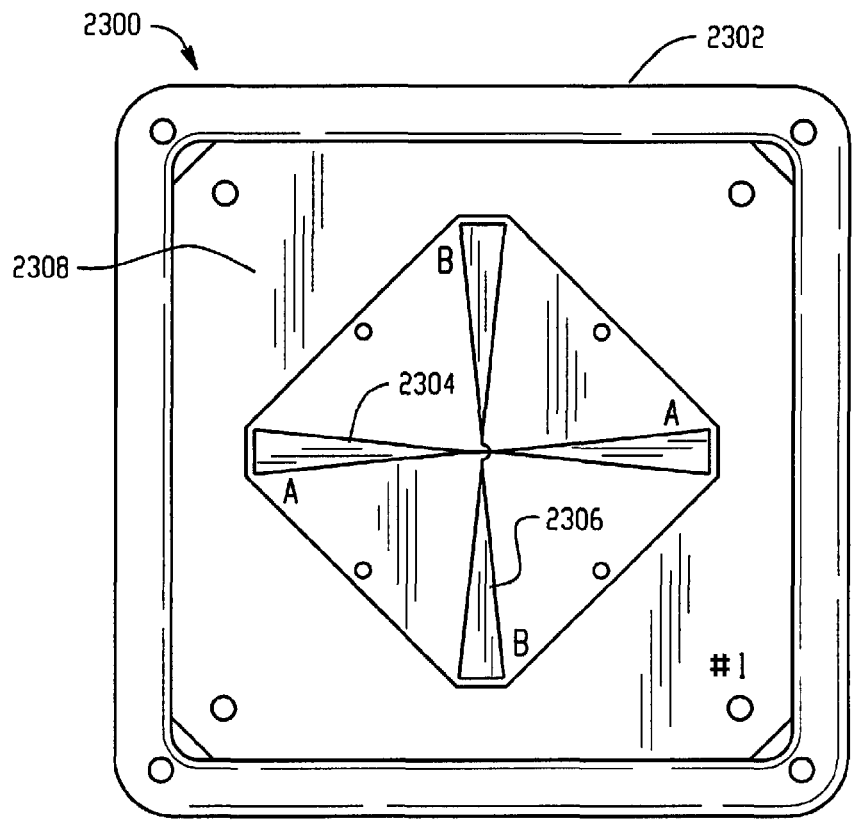
FIG. 23 depicts an example transmitter unit that includes two orthogonally positioned antennas positioned in the same plane over a reflective ground plane.

FIG. 23 depicts an example transmitter unit 2302 that includes two orthogonally positioned antennas A 2304 and B 2306 positioned in the same plane over a reflective ground plane 2308.

Figure 24:
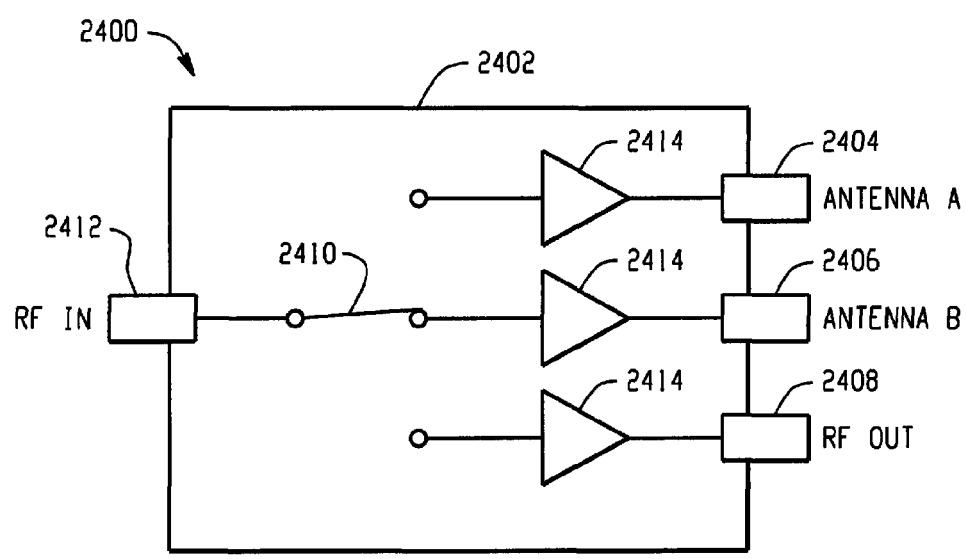
FIG. 24 depicts an example transmitter for selecting among two antennas

FIG. 24 depicts an example transmitter 2402 for selecting among two antennas, such as the antennas depicted in FIG. 23. The transmitter 2402 includes an output to a first antenna 2404, antenna A, and a second antenna 2406, antenna B. The transmitter 2402 receives a selection signal from an RFID monitoring reader. When the transmitter 2402 is the selected transmitter, the transmitter 2402 provides an identification impulse from both antenna A 2404 and antenna B 2406. This identification impulse may be radiated by the two antennas simultaneously or sequentially. Because of the orthogonal alignment of the two antennas 2404, 2406, the transmitter 2402 has an increased chance of providing a stronger signal to any RFID tags in range. If the transmitter 2402 is not the selected transmitter, then the transmitter 2402 may enter a repeater mode, where a selection signal is propagated to a next transmitter in a transmit path via an RF output 2408. Selection among antenna A 2404, antenna B 2406, and the RF output 2408 is controlled by a switch 2410 that is responsive to an RF input port 2412. One or more amplifiers 2414 may also be present, where the one or more amplifiers 2414 may amplify their respective received signals by the same or differing amounts.

To minimize the probability of missing a tag, antenna read zones typically overlap substantially. This means a given tag is often read by two or more antenna zones. In a passive EPC embodiment, transmitters are much denser than receivers due to the tag's dependence upon a nearby transmitter to receive power to modulate its response to an identification signal.

An algebraic manipulation of tag read count and maximum RSSI may be utilized to determine an antenna to which a tag is closest. This algebraic manipulation can be extended to a passive EPC embodiment by assigning the tag's location to the "winning" transmitter; it can also be applied to the dual dipoles within the winning transmitter to determine the tag's orientation.

It is often very valuable to know which direction a particular tagged asset is facing. Retail traffic patterns, and thus product exposure, can be substantially different for one axis versus the other.

In one example, each of the two orthogonal linear-polarity elements in a given transmitter radiate separately and sequentially. Reads from the element oriented along the A axis are recorded separately from reads associated with the B axis element.

By aligning and anchoring all antennas in the same A vs. B orientation throughout a retail space during system installation, the A radiating elements of each antenna can be used to monitor one axis of a retail space (e.g., aisles that pass along endcaps), and the B radiating elements can be used to monitor the other axis (e.g., aisles that pass perpendicular to endcaps, that contain main gondola shelving and "sidewings"). Linear polarity of a passive EPC tag reduces the signal strength from the transmitter radiating element that is orthogonal ("cross-poled") to the tag's polarity by as much as 6 dB.

When the algebraic manipulation is applied, tags that face one direction (e.g. endcap) can be distinguished from adjacent tags facing the other direction (e.g., sidewing or gondola). This process can also be used in receiver antennas for additional assurance that orientation is correctly determined. A third axis could be added to transmitter and receiver antennas to monitor tags that are oriented along the "Z axis" (vertically) if that is a common orientation for certain assets. If so, the algebraic manipulation could then be applied to the third axis to distinguish tags that are mounted vertically (e.g., "clip-strips") in addition to the other two axes.

As another example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores, and data structures described herein may be connected directly or indirectly to each other in order to allow the flow of data needed for their operations. It is also noted that a module or processor includes but is not limited to a unit of code that performs a software operation and can be implemented, for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It may be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate a situation where only the disjunctive meaning may apply.

The disclosure has been described with reference to particular exemplary embodiments. However, it will be readily apparent to those skilled in the art that it is possible to embody the disclosure in specific forms other than those of the embodiments described above. The embodiments are merely illustrative and should not be considered restrictive. The scope of the disclosure is given by the appended claims, rather than the preceding description, and all variations and equivalents which fall within the range of the claims are intended to be embraced therein.

It is claimed:

1. A system for monitoring a plurality of RFID tags, the system comprising:
    a plurality of serially connected transmitters along a transmit path, a serially connected transmitter configured to:
    identify a position of the serially connected transmitter in a transmit path by measuring a signal strength of a calibration signal at the serially connected transmitter;
    relay a received transmitter selection signal when the transmitter selection signal identifies a selected transmitter as being further along the transmit path than the serially connected transmitter; and
    transmit an identification impulse using a transmit antenna when the transmitter selection signal identifies the serially connected transmitter as being the selected transmitter;
    a control unit responsive to a plurality of transmit paths, the control unit being configured to send the transmitter selection signal along a selected transmit path, the transmitter selection signal identifying one of the plurality of serially connected transmitters along the selected transmit path as the selected transmitter for transmitting the identification impulse; and
    a receiver configured to receive an RFID response signal generated in response to the transmitted identification impulse using a receive antenna.

2. The system of claim 1, wherein the serially connected transmitter includes a Zener diode.

3. The system of claim 2, wherein the calibration signal is transmitted along a transmit path at a predetermined level, wherein the Zener diode at the serially connected transmitter drops the voltage a predictable amount prior to propagating the calibration signal to a next transmitter on the transmit path.

4. The system of claim 1, wherein the control unit comprises a computer-readable memory storage device containing a transmit order data structure.

5. The system of claim 4, wherein the transmit order data structure includes a sequence of transmitters to be selected by the control unit, wherein the control unit sends a first transmitter selection signal along a transmit path containing a first selected transmitter identified by the transmit order data structure, and the control unit subsequently sends a second transmitter selection signal along a transmit path containing a second selected transmitter identified by the transmit order data structure.

6. The system of claim 4, wherein the transmit order data structure identifies certain transmitters as selected transmitters more frequently than other transmitters.

7. The system of claim 6, wherein an area of coverage is divided into sub-areas of different priority levels, wherein transmitters in sub-areas of a high-priority level are identified as selected transmitters more often than transmitters in sub-areas of a lower priority level.

8. The system of claim 1, wherein a plurality of receivers are configured to receive an RFID response signal;
    wherein the control unit includes a computer-readable memory storage device, wherein the computer-readable memory storage device contains a transmitter-receiver order data structure; and
    wherein the transmitter-receiver order data structure includes a sequence of transmitter-receiver pairs to be selected by the control unit.

9. The system of claim 8, wherein the control unit sends a first transmitter selection signal along a transmit path containing a first selected transmitter identified by the transmitter-receiver order data structure, and the control unit sends a first receiver transmitter selection signal along a receive path containing a first selected receiver identified by the transmitter-receiver order data structure;
    wherein the first selected transmitter transmits an identification impulse, and the first selected receiver receives an RFID response signal generated in response to the identification impulse; and
    wherein the control unit subsequently sends a second transmitter selection signal along a transmit path containing a second selected transmitter identified by the transmitter-receiver order data structure, and the control unit sends a second receiver transmitter selection signal along a receive path containing a second selected receiver identified by the transmitter-receiver order data structure.

10. The system of claim 9, wherein the transmitter-receiver order data structures identifies certain transmitter-receiver pairs more frequently than other transmitter-receiver pairs.

11. The system of claim 10, wherein an area of coverage is divided into sub-areas of different priority levels, wherein transmitter-receiver pairs in sub-areas of a high-priority level are identified more often than transmitter-receiver pairs in sub-areas of a lower priority level.

12. The system of claim 8, wherein certain transmitter-receiver pairs are not identified by the transmitter-receiver order data structure.

13. The system of claim 8, wherein the computer-readable memory storage device further includes an allowed combination data structure, wherein the allowed combination data structure identifies transmitter-receiver pairs that can be selected by the control unit.

14. A system for monitoring a plurality of RFID tags, the plurality of RFID tags including a plurality of first-protocol RFID tags and a plurality of second-protocol RFID tags, a first protocol using passive RFID tags, a second protocol using battery-assisted RFID tags, the system comprising:
    a plurality of serially connected transmitters along a transmit path, a serially connected transmitter configured to:
    identify a position of the serially connected transmitter in a transmit path by measuring a signal strength of a calibration signal at the serially connected transmitter;
    receive a transmitter selection signal that identifies a selected protocol according to which of the first protocol and the second protocol the identification impulse is to be transmitted, the transmitter selection signal further identifying a selected transmitter;
    relay the received transmitter selection signal when the transmitter selection signal identifies the selected transmitter as being further along the transmit path than the serially connected transmitter; and transmit two identification impulses using two orthogonal linear-polarized transmitter antennas when the transmitter selection signal identifies the serially connected transmitter as being the selected transmitter;

a control unit responsive to a plurality of transmit paths, the control unit being configured to send the transmitter selection signal along a selected transmit path, the transmitter selection signal identifying one of the plurality of serially connected transmitters along the selected transmit path as the selected transmitter for transmitting the identification impulse, the control unit including a computer-readable memory storage device containing a transmit order data structure; and a receiver configured to receive an RFID response signal generated in response to the transmitted identification impulse using a receive antenna.

15. The system of claim 14, wherein the transmit order data structure includes a sequence of transmitters to be selected by the control unit, wherein the control unit sends a first transmitter selection signal along a transmit path containing a first selected transmitter identified by the transmit order data structure, and the control unit subsequently sends a second transmitter selection signal along a transmit path containing a second selected transmitter identified by the transmit order data structure.

16. The system of claim 14, wherein the transmit order data structure identifies certain transmitters as selected transmitters more frequently than other transmitters.

17. The system of claim 16, wherein an area of coverage is divided into sub-areas of different priority levels, wherein transmitters in sub-areas of a high-priority level are identified as selected transmitters more often than transmitters in sub-areas of a lower priority level.

18. The system of claim 14, wherein a plurality of receivers are configured to receive an RFID response signal;

wherein the control unit includes a computer-readable memory storage device, wherein the computer-readable memory storage device contains a transmitter-receiver order data structure; and wherein the transmitter-receiver order data structure includes a sequence of transmitter-receiver pairs to be selected by the control unit.

19. The system of claim 18, wherein the control unit sends a first transmitter selection signal along a transmit path containing a first selected transmitter identified by the transmitter-receiver order data structure, and the control unit sends a first receiver transmitter selection signal along a receive path containing a first selected receiver identified by the transmitter-receiver order data structure;

wherein the first selected transmitter transmits an identification impulse, and the first selected receiver receives an RFID response signal generated in response to the identification impulse; and wherein the control unit subsequently sends a second transmitter selection signal along a transmit path containing a second selected transmitter identified by the transmitter-receiver order data structure, and the control unit sends a second receiver transmitter selection signal along a receive path containing a second selected receiver identified by the transmitter-receiver order data structure.

20. The system of claim 19, wherein the transmitter-receiver order data structures identifies certain transmitter-receiver pairs more frequently than other transmitter-receiver pairs.

21. The system of claim 20, wherein an area of coverage is divided into sub-areas of different priority levels, wherein transmitter-receiver pairs in sub-areas of a high-priority level are identified more often than transmitter-receiver pairs in sub-areas of a lower priority level.

22. The system of claim 18, wherein certain transmitter-receiver pairs are not identified by the transmitter-receiver order data structure.

23. The system of claim 18, wherein the computer-readable memory storage device further includes an allowed combination data structure, wherein the allowed combination data structure identifies transmitter-receiver pairs that can be selected by the control unit.

* * * * *